(12) United States Patent
Kachare et al.

(10) Patent No.: US 10,846,155 B2
(45) Date of Patent: Nov. 24, 2020

(54) METHOD FOR NVME SSD BASED STORAGE SERVICE USING RPC AND GRPC TUNNELING OVER PCIE +

(71) Applicant: Samsung Electronics Co., Ltd., Suwon-si (KR)

(72) Inventors: Ramdas P. Kachare, Pleasanton, CA (US); Zvi Guz, Palo Alto, CA (US); Son T. Pham, San Ramon, CA (US); Anahita Shayesteh, Los Altos, CA (US); Xuebin Yao, San Diego, CA (US); Oscar Prem Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 16/362,604

(22) Filed: Mar. 22, 2019

(65) Prior Publication Data

US 2020/0117525 A1 Apr. 16, 2020

Related U.S. Application Data

(60) Provisional application No. 62/746,550, filed on Oct. 16, 2018.

(51) Int. Cl.
*G06F 9/54* (2006.01)
*G06F 11/30* (2006.01)
*G06F 13/42* (2006.01)

(52) U.S. Cl.
CPC .......... *G06F 9/547* (2013.01); *G06F 11/3027* (2013.01); *G06F 13/4221* (2013.01); *G06F 2213/0026* (2013.01)

(58) Field of Classification Search
CPC ...................................................... G06F 9/547
USPC ....................................................... 719/330
See application file for complete search history.

(56) References Cited

U.S. PATENT DOCUMENTS

| | | | |
|---|---|---|---|
| 7,171,494 B2 | 1/2007 | Karamanolis et al. | |
| 7,596,634 B2 | 9/2009 | Mittal et al. | |
| 9,424,273 B2 * | 8/2016 | Schay | G06F 16/183 |
| 10,552,332 B2 * | 2/2020 | Du | G06F 12/0638 |
| 2016/0197850 A1 | 7/2016 | Peng et al. | |
| 2018/0089101 A1 * | 3/2018 | Sternberg | G06F 9/45533 |
| 2018/0246833 A1 | 8/2018 | Bai et al. | |
| 2020/0042234 A1 * | 2/2020 | Krasner | G06F 9/4856 |

* cited by examiner

*Primary Examiner* — Andy Ho
(74) *Attorney, Agent, or Firm* — Renaissance IP Law Group LLP

(57) ABSTRACT

A host machine is disclosed. The host machine may include a host processor, a memory, an operating system running on the host processor, and an application running under the operating system on the host processor. The host machine may also include a Peripheral Component Interconnect Express (PCIe) tunnel to a Non-Volatile Memory Express (NVMe) Solid State Drive (SSD) and an RPC capture module which may capture the RPC from the application and deliver a result of the RPC to the application as though from the host processor, where the NVMe SSD may execute the RPC to generate the result.

21 Claims, 18 Drawing Sheets

METHOD FOR NVME SSD BASED STORAGE SERVICE USING RPC AND GRPC TUNNELING OVER PCIE +

RELATED APPLICATION DATA

This application claims the benefit of U.S. Provisional Patent Application Ser. No. 62/746,550, filed Oct. 16, 2018, which is incorporated by reference herein for all purposes.

FIELD

The inventive concepts relate generally to computer systems, and more particularly to storage devices.

BACKGROUND

In modern Information Technology (IT) infrastructures, very large amounts of data are being generated by various devices and processes. Some examples of these data generators are smart machines, autonomous vehicles, social networks, and Internet-of-Things (IOT) devices. New Artificial Intelligence (AI) and Machine Learning (ML) algorithms are being developed to effectively analyze the collected data and use it to achieve even greater efficiency and productivity of applications. The most crucial thing in such systems is to process and analyze the data.

In traditional system architectures, the data is fetched from persistent storage to high performance expensive servers, which are connected to storage using high performance networks. Moving such large amounts of raw data to the central processing unit (CPU) for processing and analyzing is expensive in terms of amount of energy consumed, and compute and network resources deployed. It increases the burden on resources such as network bandwidth, CPU cycles, and CPU memory. Moving large amounts of raw data to servers for processing also increases the latency experienced by the applications. Applications must wait for data to be fetched to the servers first before processing is done and decisions are made. These added resource requirements result in high capital and operating expenditures.

A need remains for a way to reduce the cost and increase the performance of computer systems involving processing of large amounts of data.

DETAILED DESCRIPTION

Figure 1:
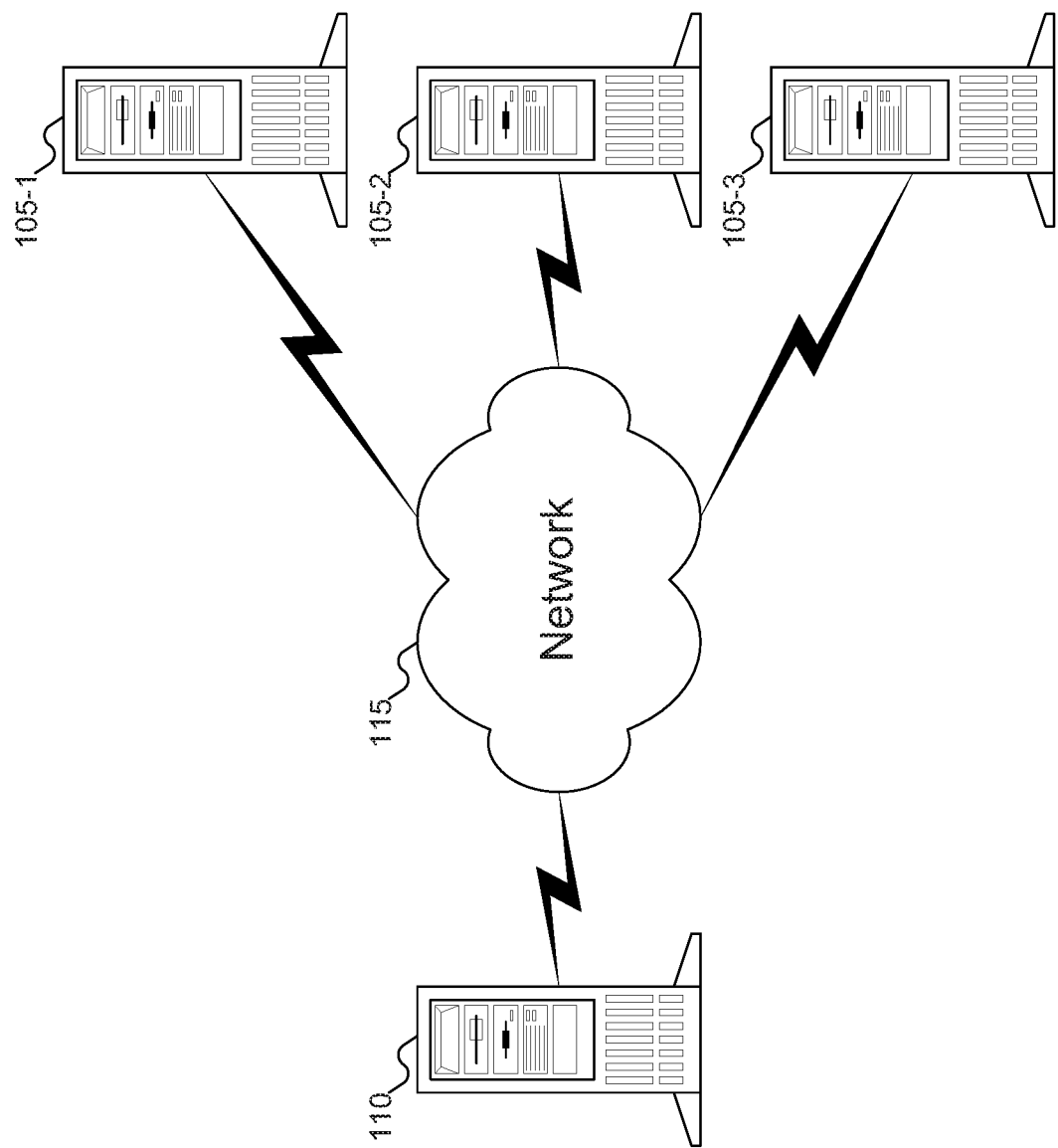
FIG. 1 shows a set of servers offering services to a client computer, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Processing raw data within the storage device, as much as possible, is a cost effective solution to data analysis use cases that are needed for monetization of the growing amount of raw data. In addition, by eliminating data movements, the response latency for applications may be improved significantly. Furthermore, data analytics tasks often read a large amount of data, process it, and reduce it through filtering and other reduction operation. These and many other similar tasks are a perfect fit for a Solid State Drive (SSD)-based service, as they both take advantage of the higher available bandwidth within the device and preserve the limited bandwidth between the SSD and the central processing unit (CPU) (i.e., the Peripheral Component Interconnect Express (PCIe) interface) by only moving the reduced results. Hence techniques that enable processing of the data closer or inside storage devices are a fundamental part of the new system architecture needed for "Data Age".

Client-server protocols are used in system architectures to cleanly and efficiently partition Information Technology (IT) server infrastructure. Application servers—also known as front-end customer facing servers—host the end-user-facing application software, whereas actual heavy duty data processing needed to provide various user services is done on backend servers. The application software stacks running on front-end and back-end servers often use "client-server" protocols to communicate with each-other. gRPC, JSON, and HTTP are examples of Remote Procedure Call (RPC) mechanisms and protocols that are used by application software stacks on one host machine to access one or more functions, procedures, or more generically "services" hosted and run on a different machine. This client-server protocol at logical level enables communication between various application programs residing on different host machines and connected by some network. Client-server protocols abstract the network transport aspects of the communication between client and server machines, thereby simplifying application programming.

A Remote Procedure Call, as the name suggests, execute a specific procedure remotely on the server, which provides this service on the calling client's behalf. The procedure is termed "remote" by virtual address space separation (but same physical) on the same system, or by being separated by a network. The procedure, when run remotely, may touch on data that is local to it and by doing so work more efficiently with the caller's latencies. The RPC is a mechanism which packages the input parameters to the called procedure (also called marshalling) at the caller's side. The RPC receiving stub on the receiving server side unpacks the packed inputs and passes them to the service. This way the actual contents may be opaque in transmission be it local (different address spaces) or remote (different systems connected by a network). Because RPCs may work either locally or remotely and may hide their locality, the calling application need not know where the server resides. Well-known examples of RPC usages are NFS, Microsoft .NET Remoting, XML-RPC, JSON-RPC and COBRA, to name a few.

With device-based service mechanisms, a third type of usage arises where the device is local but separated by virtual as well as physical address spaces. This is because the device and the application host their own physical address space that need not be one as in traditional systems built on the x86 architecture. These independent physical address spaces provide new avenues for device vendors to host the device as servers. A mechanism such as RPC is ideal to bridge the communication between the application and the server hosted by the device and doing so may seamlessly transition existing usages to new device specific implementations.

Normally a RPC protocol is implemented using a network protocol stack such as Transmission Control Protocol/Internet Protocol (TCP/IP) for communication. As an alternative to using TCP/IP, embodiments of the inventive concept may transport RPC messages over Peripheral Component Interconnect Express (PCIe). PCIe is not a network protocol but rather a bus interface used within a host server or a chassis to connect end devices and peripherals to the host. gRPC tunneling over PCIe may then be used to connect software stack running on x86 host to the services being hosted on a Non-Volatile Memory Express (NVMe) Solid State Drive (SSD) directly attached to that host. This mechanism allows certain application functions to be offloaded and accelerated onto a Direct-Attached Storage (DAS) NVMe SSD without significant changes to the host stack.

For purposes of example, embodiments of the inventive concept are described below with specific reference to gRPC, an open-source RPC implementation originally developed at Google LLC, but embodiments of the inventive concept are equally applicable to other RPC system implementations. Any reference to gRPC should be understood as also applying to other client-server protocols, such as XML, JSON, HTTP etc., as well as REST API based protocols.

Tunneling gRPC Over PCIe

A "client-server" protocol such as gRPC is normally used when client and servers are located on different server machines that are connected using a network interconnect. The network protocols such as TCP/IP over Ethernet are used as transport mechanisms. Instead of using TCP/IP and Ethernet in this manner, embodiments of the inventive concept enable "clients" to be located on a server machine and the "server" to be located on an NVMe SSD. NVMe SSDs use a PCIe host interface for communication with the host CPU. The NVMe SSDs are directly attached to the CPU (DAS) rather than use a network protocol as transport mechanism. Hence a solution is needed for enabling "client-server" communication between host CPU and an NVMe SSD in DAS mode. For this purpose a method is needed that may tunnel "client-server" protocols running on the host to the NVMe SSD. With such a method, existing applications that use client-server methodology will work in this system architecture without any significant changes (and possibly without any change at all). Additionally, new applications may be developed using a "client-server" methodology that may benefit from data processing services offered from a storage device. Applications using embodiments of the inventive concept may be portable and agnostic to the underlying storage and networking infrastructure. Such applications may benefit from the processing of data, as much as possible, in the storage device itself, thereby significantly cutting down on data movements to the host CPU. The reduction in data movement provides significant benefits in terms of reduced energy consumption, reduced computing resources, and decreased network infrastructure costs.

There are two major components needed for tunneling gRPC over PCIe: 1) interception of gRPC messages; and 2) transporting gRPC messages across a PCIe interface in a reliable, in-order fashion.

There are multiple ways in which gRPC messages may be captured before they are sent over the network interface. The captured gRPC messages may then handed over to a PCIe tunnel module for transporting to the other side. Such gRPC tunneling may be done in both directions in full-duplex manner. The proposed PCIe tunnel may provide a reliable, in-order transport for the messages. That is, the PCIe tunnel module may transport the gRPC messages in the same order in which they were received. The PCIe tunnel may manage message flow control as well as any retransmissions needed due to PCIe level errors. There are multiple ways in which PCIe tunnel may be implemented with different trade-offs. The tunneling methods described here may also be applied to other host-device interfaces such as Gen-Z, CCIX, and OpenCAPI. Subsequent sections describe the details of both gRPC message capture/replay and PCIe tunnel.

gRPC Call Interception

For tunneling gRPC messages across PCIe, those messages traveling between gRPC Client and the gRPC Server first need to be captured on one end and be delivered and replayed on the other end.

The interception point of the messages determines the depth of the host software stack that is traversed by the messages before getting into the PCIe tunnel. This in turn influences the performance of the overall client-server stack performance. In general, the higher the capture point in the host software stack, the better the performance, but the changes to the software stack may be more complicated.

1) gRPC MitM Method

In some embodiments of the inventive concept, gRPC messages may be captured using a Man-in the-Middle (MitM) module. Basically, a MitM shim module captures the gRPC messages and sends them to the PCIe tunnel module.

The MitM module uses following two functions:
bool PUSH(queue, msg_data); //return success or failure. Should not fail.
msg_data POP(queue); //returns the data or NULL if channel is empty.

These message push/pop functions are used in conjunction with two queues: a request-messages-queue and a response-messages-queue. The PCIe tunnel module essentially interfaces with the MitM module through these two queues to exchange gRPC messages.

2) System Call Capture Method

In other embodiments of the inventive concept, the gRPC and other client-server protocols use socket system calls to establish a communication channel. Examples of the system calls used for executing gRPC connections include socket( ), sendmsg( ), rescvmsg( ). The identified system calls may be re-implemented and substituted for the original library functions. As an example, the dynamic linker in the Linux operating system (OS) may link to the new definitions of the identified system calls using the LD_PRELOAD feature. The LD_PRELOAD feature in the Linux OS provides a mechanism to supply alternative symbol definitions of the standard libraries. The intercepted system calls may be then used to capture the gRPC messages and forward them to the PCIe tunnel module.

It is also possible to just wrap the original system calls in new definitions instead of completely substituting them. That is, the new definitions of the identified system calls may in turn call the original functions for all the applications other than gRPC and/or other client-server protocol that are being tunneled.

3) Ethernet Frame Transport

In other embodiments of the inventive concept, the Ethernet frames that carry gRPC messages may be sent over the PCIe tunnel. These embodiments of the inventive concept may involve significantly fewer changes to the software stack, but at the potential cost of increased latency. A filter module may identify the appropriate Ethernet frames based on the inspection of the network protocol fields. This filter may check the Ethernet, TCP, UDP, IP, etc. headers to identify the Ethernet frames that are pertinent to gRPC connections of interest. The identified frames are then passed onto the PCIe tunnel to be sent to the NVMe SSD, instead of being sent along the normal path through Ethernet Medium Access Control (MAC) to a remote network destination. Similar Ethernet frame filtering operation may be performed in the reverse direction: i.e., from the NVMe SSD to the host.

4) gRPC Endpoint Vtable

In other embodiments of the inventive concept, a gRPC transport layer may be defined using the endpoint vtable definitions. Conventionally, gRPC defines three transports: HTTP/2, Cronet, and In-Process. In these embodiments of the inventive concept, a fourth transport mechanism may be defined using the abstractions provided by grpc_endpoint_vtable. Since RPC may extend the definition locally and remotely, such embodiments of the inventive concept may abstract a local and remote server when this transport is utilized. Such gRPC transports may also be abstracted to network interfaces such as Remote Direct Memory Access (RDMA) and TCP.

Table 1 below provides example procedure calls in the vtable that may be exposed using these embodiments of the inventive concept.

TABLE 1

| Table function | Function Definition | Details | Maps to PCIe (local) | Maps to RDMA (remote) |
| --- | --- | --- | --- | --- |
| read | void grpc_endpoint_read( grpc_endpoint* ep, grpc_slice_buffer* slices, grpc_closure* cb); | When data is available on the connection, calls the callback with slices. Callback success indicates that the endpoint may accept more reads, failure indicates the endpoint is closed. Valid slices may be placed into \a slices even when the callback is invoked with error != GRPC_ERROR_NONE. | Yes callback implies async operation | Yes callback implies async operation |
| write | void grpc_endpoint_write( grpc_endpoint* ep, grpc_slice_buffer* slices, grpc_closure* cb, void* arg); | Write slices out to the socket. If the connection is ready for more data after the end of the call, it returns GRPC_ENDPOINT_DONE. Otherwise it returns GRPC_ENDPOINT_PENDING and calls cb when the connection is ready for more data. \a slices may be mutated at | Yes | Yes |

TABLE 1-continued

| Table function | Function Definition | Details | Maps to PCIe (local) | Maps to RDMA (remote) |
|---|---|---|---|---|
| | | will by the endpoint until cb is called. No guarantee is made to the content of slices after a write EXCEPT that it is a valid slice buffer. \a arg is platform specific. It is currently only used by TCP on linux platforms as an argument that would be forwarded to the timestamps callback. | | |
| add_to_pollset | void grpc_endpoint_add_to_pollset( grpc_endpoint* ep, grpc_pollset* pollset); | Add an endpoint to a pollset or pollset_set, so that when the pollset is polled, events from this endpoint are considered | Yes Async operations | Yes Does the pollset block? |
| add_to_pollset_set | void grpc_endpoint_add_to_pollset_set( grpc_endpoint* ep, grpc_pollset_set* pollset_set); | | Yes | Yes |
| delete_from_pollset_set | void grpc_endpoint_delete_from_pollset_set( grpc_endpoint* ep, grpc_pollset_set* pollset_set); | Delete an endpoint from a pollset_set | Yes | Yes |
| shutdown | void grpc_endpoint_shutdown( grpc_endpoint* ep, grpc_error* why); | Causes any pending and future read/write callbacks to run immediately with success == 0 | Yes | Yes |
| destroy | void grpc_endpoint_destroy( grpc_endpoint* ep); | | Yes | Yes |
| get_resource_user | grpc_resource_user* grpc_endpoint_get_resource_user( grpc_endpoint* endpoint); | | Yes | Yes |
| get_peer | char* grpc_endpoint_get_peer( grpc_endpoint* ep); | | Yes | Yes |
| get_fd | int grpc_endpoint_get_fd( grpc_endpoint* ep); | Get the file descriptor used by \a ep. Return −1 if \a ep is not using an fd. | Yes. fd is derived from endpoint already created | Yes. fd is derived from endpoint already created |

To establish the gRPC transport, a create function may be implemented to establish the endpoint table.

PCIe Tunnel

The PCIe tunnel provides a method for transporting messages from the host to the NVMe SSD and vice versa. The PCIe tunnel is agnostic to the actual message contents and does not interpret the messages. As far as the PCIe tunnel is concerned, the message is just a block of data that is being transferred to the other side of the tunnel in a reliable, in-order fashion. The PCIe tunnel may use PCIe Memory Read and PCIe Memory Write transactions to perform the data transfers. There are multiple methods of PCIe Tunnel implementations with different trade-offs.

1) Separate Memory Model

In some embodiments of the inventive concept, the host and the NVMe SSD may have separate tunnel buffers that may be written by each other. Such embodiments of the inventive concept do not use PCIe Memory Read transactions from either side. Since PCIe Memory Read transactions are non-posted operations, they tend to have performance impact. When one end needs to send a message to the other side, it may write that message to the remote buffer. The remote end may monitor writes to its local receive buffer and retrieves the messages from the buffer. The flow control needed for communication is achieved by the tunnel agents by exchanging appropriate read and write pointers of the buffers to each other. By eliminating PCIe reads, such embodiments of the inventive concept may offer a high performance, full duplex PCIe tunnel.

A Tunnel Agent (TA) may be used at each end of the tunnel. The PCIe tunnel is symmetric in the sense that the same TA module may be instantiated at both ends. Each TA has a local buffer memory to receive messages from the remote TA. A TA may use four pointers for message exchange and flow control. A TA maintains two pointers: 1) $R_L$ (read local) to read received messages from its local buffer, and 2) $W_R$ (write remote) to transmit new message to the remote end. The other two pointers are received by the TA at fixed location in the buffer from the remote TA: 3) $R_R$ (read remote) to know whether the remote TA has space available for new messages, and 4) $W_L$ (write local) to know how much message data has been written by the remote TA that may be read by the local TA. In these pointers, "R" denotes a Read address and a "W" denotes a Write address; "L" denotes a Local address and "R" denotes a Remote address.

Each TA instance may be informed about the base addresses and sizes of the local and remote buffers by higher level software or firmware as applicable. Using these four buffer pointers and only PCIe Memory Write transactions the two TAs may establish a high performance, full duplex PCIe tunnel to exchanges variable sized messages.

When a TA wants to transmit a message, it uses its $W_R$ pointer to write the message to the remote TA buffer. After writing the message, the TA may update the $W_R$ pointer in the remote buffer at a fixed location. The updated $W_R$ pointer may then be used by the remote TA to know that it has received a new message. The TA may also update the $R_L$ pointer to inform the remote TA that, it has space to receive more messages (for example, as messages are removed from the buffer local to the TA). The four buffer pointers are used by each TA to compute the amount of local data available for reading and amount of remote space available for writing. These data and space available values are in turn used to achieve reliable message transfers. The buffers are used in a ring manner: the Read and Write pointers wrap back to zero after reaching max value (i.e. the buffer size). Table 2 shows the four buffer pointers, and Table 3 shows what information may be deduced from the four buffer pointers.

TABLE 2

| Term | Comment |
| --- | --- |
| $W_L$ | Local Write pointer to the buffer, received from Remote TA, fixed location in buffer. |
| $R_R$ | Remote Read pointer to the buffer, received from Remote TA, fixed location in buffer. |
| $W_R$ | Remote Write pointer, used to post messages to the remote peer. |
| $R_L$ | Local Read pointer, used to drain messages received from the remote peer. |

Above four pointers are used to compute local data and remote space available status as described below.

TABLE 3

| | Remote Buffer Full |
| --- | --- |
| $((W_R + 1) == R_R)$ | Remote Ring Buffer Full, may not post any more messages |
| | Remote Space Available |
| If $W_R > R_R$: $(SIZE_R - (W_R - R_R))$ If $W_R < R_R$: $(R_R - W_R)$ | Amount of space available for message data to transmit to the remote message buffer |
| | Local Ring Buffer Empty |
| $(R_L == W_L)$ | Local Ring Buffer Empty, nothing to read out |
| | Local Data Available |
| If $W_L > R_L$: $(W_L - R_L)$ If $W_L < R_L$: $(SIZE_L - (R_L - W_L))$ | Amount of received message data available to read out from the local message buffer |

The location and size of the separate buffers in the host memory and the SSD memory may be reported through registers located at a fixed offset in the SSD Base Address Register (BAR) address space. The SSD may advertise its local buffer address and size after power on through a BAR register, which the host may read. The host may configure the location and size of its own buffer in the host memory to a well-known register in the SSD BAR address space, which may be read by the SSD. Multiple message channels, if desired, may be supported by using multiple buffers.

In these embodiments of the inventive concept, there should be only be one owner on either side for the respective pointers. For the host and applications, a central kernel device driver or something similar in user space may be used to implement the TAs and the buffers.

In some embodiments of the inventive concept using a ring queue buffer model, the TAs may only expose short buffers that contain a collection of physical pages located in other parts of memory accessible to the remote TA. Such embodiments of the inventive concept provide indirection to the actual tunnel data buffer locations. The pointers may be processed as described above but the actual tunnel data may be placed in the page locations listed within these short buffers. This model provides a scalable buffer scheme with data buffer locations that may be changed by its local owner. For example, one TA may request a total data buffer size of 16 Mbytes initially, and later change the total data buffer size to 256 Mbytes over time. The SSD or host tunnel buffer locations may be updated to reflect the new size with the corresponding buffer values. Since the ring buffer queue at either end that contains the collection of data buffer addresses is small, it may be replicated and expanded into multiple queues over time as required.

2) Shared Memory Model

In other embodiments of the inventive concept, the NVMe SSD (or the host) may provide a memory buffer that is shared with the other device over the PCIe interface. Basically, the storage device or the host may provide a memory buffer that is advertised using a PCIe BAR to the other side. The other side may then read or write to the shared buffer using PCIe memory Read/Write transactions. In other words, the party that is accessing a shared memory from the other side of the PCIe interface may be responsible for moving messages to the buffer across PCIe interface. For example, if the NVMe SSD shares its memory buffer with the host, the host is responsible for moving messages to and from the host memory buffer to the NVMe SSD memory buffer; the NVMe SSD reads and writes its messages to the local buffer memory. The location of the shared buffer in the hosting device may be fixed with respect to a BAR address, or it may be advertised to the other party through a register at a fixed location in the BAR address space. The size of the buffer may be specified through another fixed BAR offset. Message flow control related information is also similarly shared between the host and the NVMe SSD through registers at fixed locations in the BAR address space. Multiple tunnel channels may be supported through multiple numbers of such buffers.

If the NVMe SSD shares its memory buffer with the host using these embodiments of the inventive concept, the host software may perform all the PCIe transactions to move messages between the host and the NVMe SSD. This implementation may not be optimal from a performance point of view.

As suggested above, the shared memory may also be located on the host side, and the storage device may perform all the PCIe Read/Write transactions to that buffer. In such embodiments of the inventive concept, the host does not perform PCIe transactions, hence the overall performance may be better. The host software may poll the shared buffer to check for reception of the messages from the NVMe SSD. The NVMe SSD may also issue an interrupt, such as MSI or MSI-X, to the host after depositing a message in the host memory. By using an interrupt model, the host software may not need to poll its incoming buffer, but just use the received interrupt as a trigger to read out the received message. The location and size of the shared buffers in the host memory may be indicated to the NVMe SSD tunnel agent through a register located at a fixed offset in the NVMe SSD BAR address space. Message flow control related information is also shared between the host and the NVMe SSD through fixed locations in the SSD BAR address space. A number of message channels may be supported using multiple buffers.

FIG. 1 shows a set of servers offering services to a client computer, according to an embodiment of the inventive concept. In FIG. 1, servers 105-1, 105-2, and 105-3 are shown communicating with client machine 110 over network 115. In general, server systems include more than one server offering a service, but there may be any number of servers, even just one.

Network 115 may be any desired variety of network, including Local Area Networks (LANs), Wide Area Networks (WANs), Metropolitan Area Networks (MANs), and global networks such as the Internet. In addition, network 115 may include wired networks, wireless networks or both. Network 115 may also include combinations of these networks: for example, client machine 110 may connect with server 105-1 via a LAN (including client machine 110), a global network, and a LAN (including server 105-1).

Although FIG. 1 depicts servers 105-1, 105-2, and 105-3 as a server (which could be either a standalone or a rack server), embodiments of the inventive concept may include servers 105-1, 105-2, and 105-3 of any desired type without limitation. Similarly, client machine 110 may be of any desired type without limitation. For example, server 105-1 could be replaced with a desktop or a laptop computer or any other machine that may benefit from embodiments of the inventive concept. Server 105-1 may also include specialized portable computing machines, tablet computers, smartphones, and other computing machines.

Figure 2:
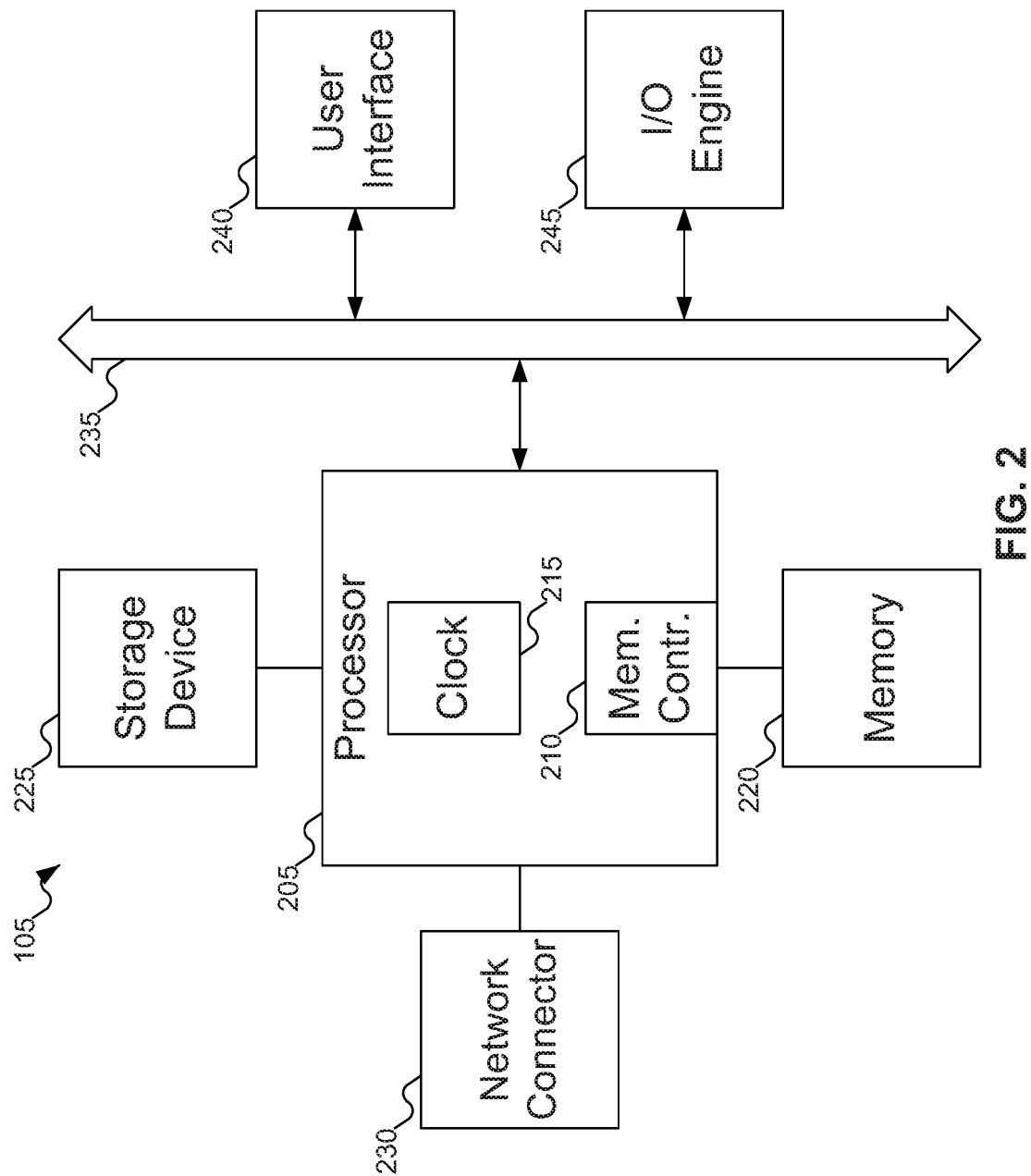
FIG. 2 shows details of the servers of FIG. 1.

FIG. 2 shows details of servers 105-1, 105-2, and 105-3 of FIG. 1 (referred to simply as server 105 in the remainder of this document). In FIG. 2, typically, server 105 includes one or more processors 205, which may include memory controllers 210 and clocks 215, which may be used to coordinate the operations of the components of server 105. Processors 215 may be any variety of processors: for example, an Intel Xeon, Celeron, Itanium, or Atom processor, an AMD Opteron processor, an ARM processor, etc. While FIG. 2 shows a single processor 215 in server 105, server 105 may include any number of processors, each of which may be single core or multi-core processors, and may be mixed in any desired combination.

Processors 205 may also be coupled to memories 220. Memories 220 may be any variety or varieties of memory, such as flash memory, Dynamic Random Access Memory (DRAM), Static Random Access Memory (SRAM), Persistent Random Access Memory, Ferroelectric Random Access Memory (FRAM), Non-Volatile Random Access Memory (NVRAM), such as Magnetoresistive Random Access Memory (MRAM) etc., or other state preserving media, as examples. Memories 220 may also be any desired combination of different memory types.

Processors 205 may also be coupled to storage devices 225. As described below, storage device 225 may be any desired form of storage device that communicates with processors 205 over a Peripheral Component Interconnect Exchange (PCIe) interface: a Non-Volatile Memory Express (NVMe) Solid State Drive (SSD) is used as an example below.

Processors 205 may also be coupled to network connector 230, which may be, for example, an Ethernet connector or a wireless connector. Processors 205 may also be connected to buses 235, to which may be attached user interfaces 240 and Input/Output interface ports that may be managed using Input/Output engines 245, among other components.

Figure 3:
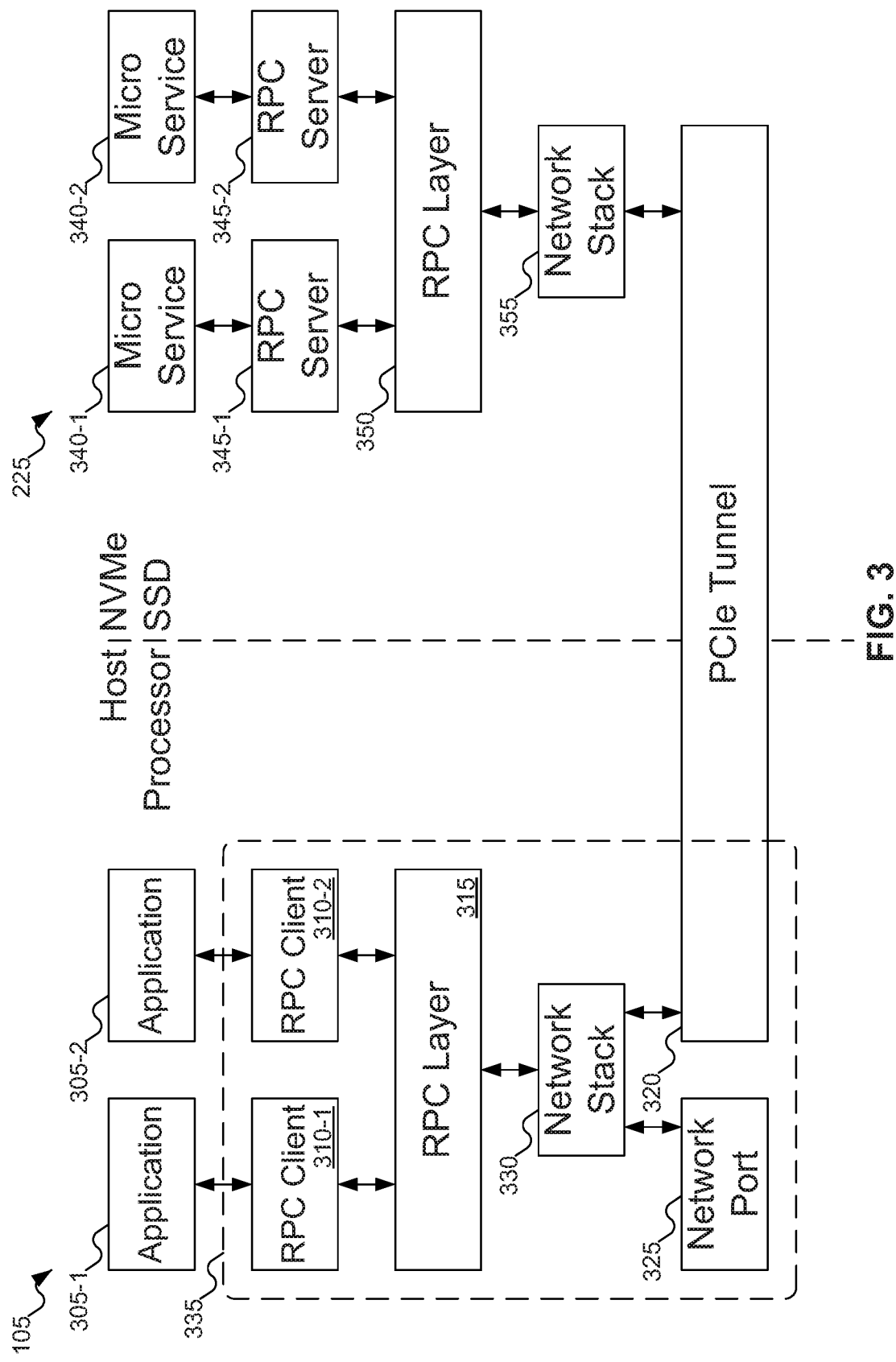
FIG. 3 shows the software stacks in the server of FIG. 1 and the storage device of FIG. 2.

FIG. 3 shows the software stacks in server 105 of FIG. 1 and storage device 225 of FIG. 2. In FIG. 3, applications 305-1 and 305-2 are shown, which may be running on processor 205 of FIG. 2. While FIG. 3 shows two applications 305-1 and 305-2, embodiments of the inventive concept may support any number of applications running at any given time, and the number of applications 305-1 and 305-2 executing on processor 205 of FIG. 2 may vary over time. Each application 305-1 and 305-2 may initiate remote procedure calls (RPCs). In conventional servers, applications 305-1 and 305-2 expect processor 205 of FIG. 2 to execute the RPCs. Embodiments of the inventive concept may not require applications 305-1 and 305-2 to be modified, permitting existing applications to benefit from in-storage execution of RPCs.

Conventionally, when applications 305-1 and 305-2 issue RPCs, the RPCs are received by RPC clients 310-1 and 310-2. While FIG. 3 shows each of applications 305-1 and 305-2 interacting with a single RPC client 310-1 and 310-2, there may be any number of RPC clients 310-1 and 310-2 (for example, one to support each service offered via RPC), and which RPC client 310-1 and 310-2 processes the RPC may depend on the service being requested. Thus, embodiments of the inventive concept may include any number of RPC clients 310-1 and 310-2, and applications 305-1 and 305-2 may interact with any and/or all RPC clients 310-1 and 310-2 as needed.

RPC clients 310-1 and 310-2 may pass the RPCs (perhaps wrapped in an appropriate transport protocol: for example, to specify which RPC client 310-1 and 310-2 processed the RPC) to RPC layer 315. RPC layer 315 may then further wrap the RPC in another transport protocol to pass the RPC to network stack 320. Network stack 320 may then wrap the RPC in yet another transport protocol (for example, as Ethernet data sent using the Transmission Control Protocol/Internet Protocol (TCP/IP)), which would then be sent over a network connection via network port 325 to its destination (which might be processor 205 of FIG. 2 within the same server 105 as applications 305-1 and 305-2, or might be in a physically different server). RPC clients 310-1 and 310-2, RPC layer 315, and network stack 330 may all be part of operating system 335, running on processor 205 of FIG. 2. Note that FIG. 3 is a simplified representation of the software stack, and does not necessarily show all the elements of the software stack (or of operating system 335). In addition, depending on the implementation, the software stack may omit some elements shown in FIG. 3 (or replace them with elements that may operate similarly but have different names).

NVMe SSD 225 conventionally does not support a network connection, but instead uses a PCIe interface to communicate with processor 205 of FIG. 2. If NVMe SSD 225 includes a network connection, it may be possible to simply implement NVMe SSD 225 to offer conventional RPCs and receive them over the network connection; but without a network connection NVMe SSD 225 may not support receiving RPC requests sent over a network connection as in conventional systems. The solution, therefore, is to intercept (or capture) the RPC call at some point and send the intercepted RPC call to NVMe SSD 225 across PCIe tunnel 320, which connects processor 205 of FIG. 2 with NVMe SSD 225.

As described below, there are various different places within the software stack in server 105 where the RPC may be captured. In most embodiments of the inventive concept, it is expected that the result of the RPC (as executed by NVMe SSD 225) may be inserted back into the software stack at the same point. For example, if the RPC is captured between RPC client 310-1 or 310-2 and RPC layer 315, it is expected that the result of the RPC will be inserted into the software stack at the same point; if the RPC is captured below the network stack, it is expected that the result of the RPC will be inserted into the software stack at the same point. But while it is useful to insert the result of the RPC call at the same place in the software stack, it is not required that the result be inserted at that place: that choice is simply a convenience for symmetry (and avoids any complications that might arise from any layer in the software stack tracking for a reply that might otherwise be inserted into the software stack at a higher layer). Thus, it is possible that the RPC might be captured at one layer in the software stack and the result of the RPC inserted at another layer of the software stack.

It is also worth noting that there may be multiple techniques being used in parallel within server 105 to capture RPCs. For example, server 105 might capture RPCs below the network stack (to ensure that any RPCs that might be sent to the NVMe SSD are identified), but also offer a new transport layer implementation that may be used as a result of a new system call from the application. Any given server 105 might implement any number of RPC capture techniques.

To support server 105 that might include any number of different RPC capture techniques, NVMe SSD 225 may include a software stack that mirrors the one implemented on server 105. In that manner, NVMe SSD may be able to ensure that the result of the RPC is returned to server 105 at the appropriate point in the software stack. To that end, NVMe SSD 225 may include micro-services 340-1 and 340-2, RPC servers 345-1 and 345-2, RPC layer 350, and network stack 355, as well as its end of PCIe tunnel 320. Micro-services 340-1 and 340-2 may be individual services supported by NVMe SSD 225: while FIG. 3 shows two micro-services 340-1 and 340-2, embodiments of the inventive concept may include any number of micro-services 340-1 and 340-2. RPC servers 345-1 and 345-2 act as the mirrors to RPC clients 310-1 and 310-2, with one RPC server 345-1 and 345-2 for each micro-service 340-1 and 340-2. RPC servers 345-1 and 345-2 (ultimately) receive the RPCs and pass the parameters of the RPC to micro-services 340-1 and 340-2 to be executed by an in-storage processor (not shown in FIG. 3). RPC layer 350 and network stack 355 may function similarly to RPC layer 315 and network stack 330, by adding/removing appropriate protocol information to interface with the adjacent layers in the software stack.

Figure 4:
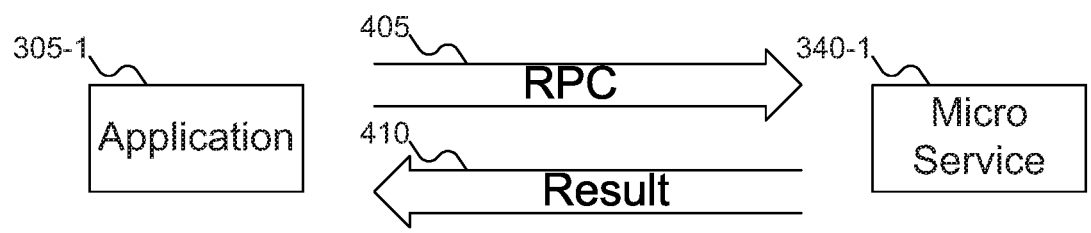
FIG. 4 shows the application of FIG. 3 sending a Remote Procedure Call (RPC) to the micro-service of FIG. 3 and receiving a response to the RPC.

FIG. 4 shows application 305-1 of FIG. 3 sending a Remote Procedure Call (RPC) to micro-service 340-1 of FIG. 3 and receiving a response to the RPC. In FIG. 4, application 305-1 may issue RPC 405. As discussed above, application 305-1 may assume that RPC 405 will be processed by processor 205 of FIG. 2, and may not be aware that RPC 405 is actually ultimately processed by NVMe SSD 225 of FIG. 2. At some point in the software stack shown in FIG. 3, RPC 405 is captured and redirected to NVMe SSD 225 of FIG. 2, which eventually directs RPC 405 to micro-service 340-1 for execution. After executing RPC 405, micro-service 340-1 generates result 410, which may then be sent back to application 305-1 (for example, reversing the path used to "send" RPC 405 from application 305-1 to micro-service 340-1).

Figure 5:
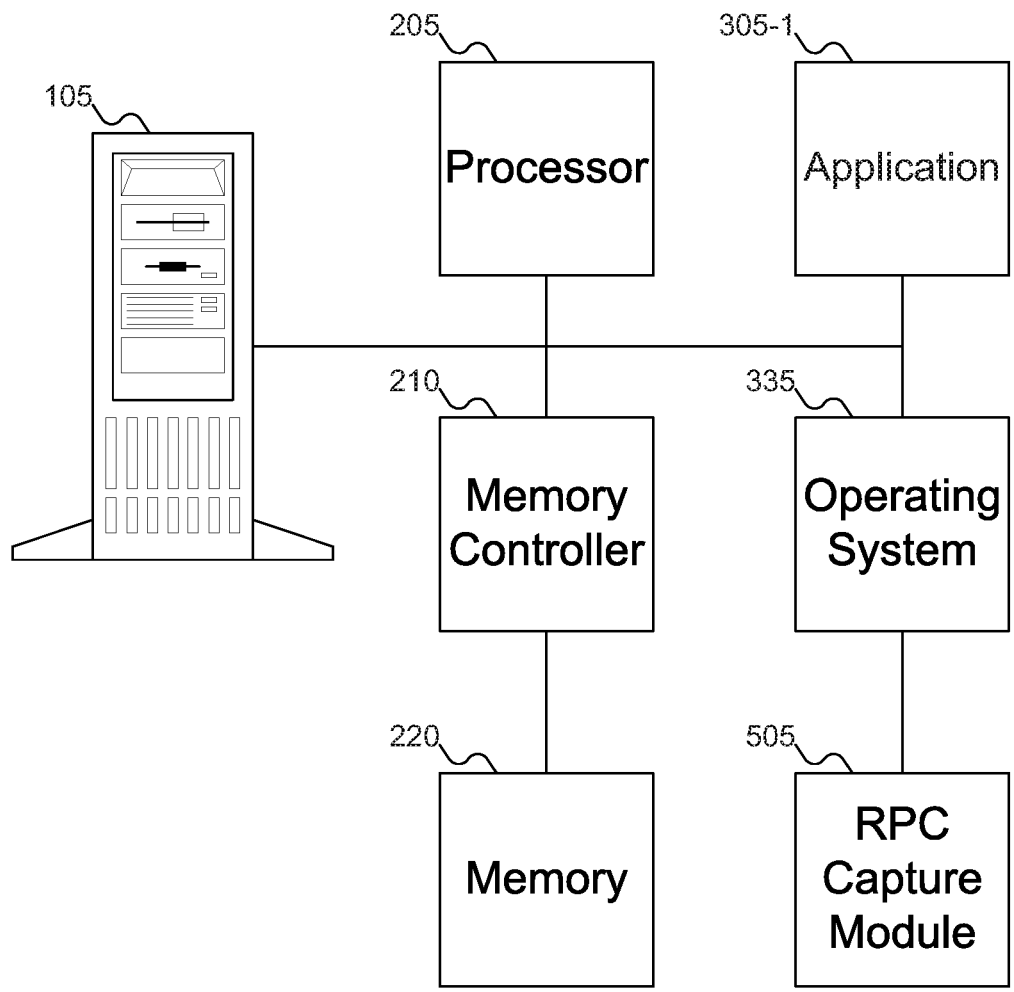
FIG. 5 shows additional details of the servers of FIG. 1.

FIG. 5 shows additional details of servers 105 of FIG. 1. In FIG. 5, server 105 is shown as including processor 205, memory controller 210, memory 220, application 305-1, operating system 335, and RPC capture module 505. Processor 205, memory controller 210, and memory 220 are configured as described above; application 305-1 may be running on processor 205 and communicating with operating system 335, which in turn may include elements such as those shown in FIG. 3.

As compared with operating system 335 as shown in FIG. 3, operating system 335 in FIG. 5 may also include RPC capture module 505. As discussed above, RPCs issued by application 305-1 might be captured at any number of places within the software stack of FIG. 3: accordingly, the specific implementation of RPC capture module 335 may vary with its placement. RPC capture module 505 may be implemented as software (for example, as part of or a plug-in to operating system 335) running on processor 205, as firmware running on appropriate hardware, or even as a strictly hardware module (for example, designed to capture Ethernet frames just before they are sent out over the wire).

Figure 6:
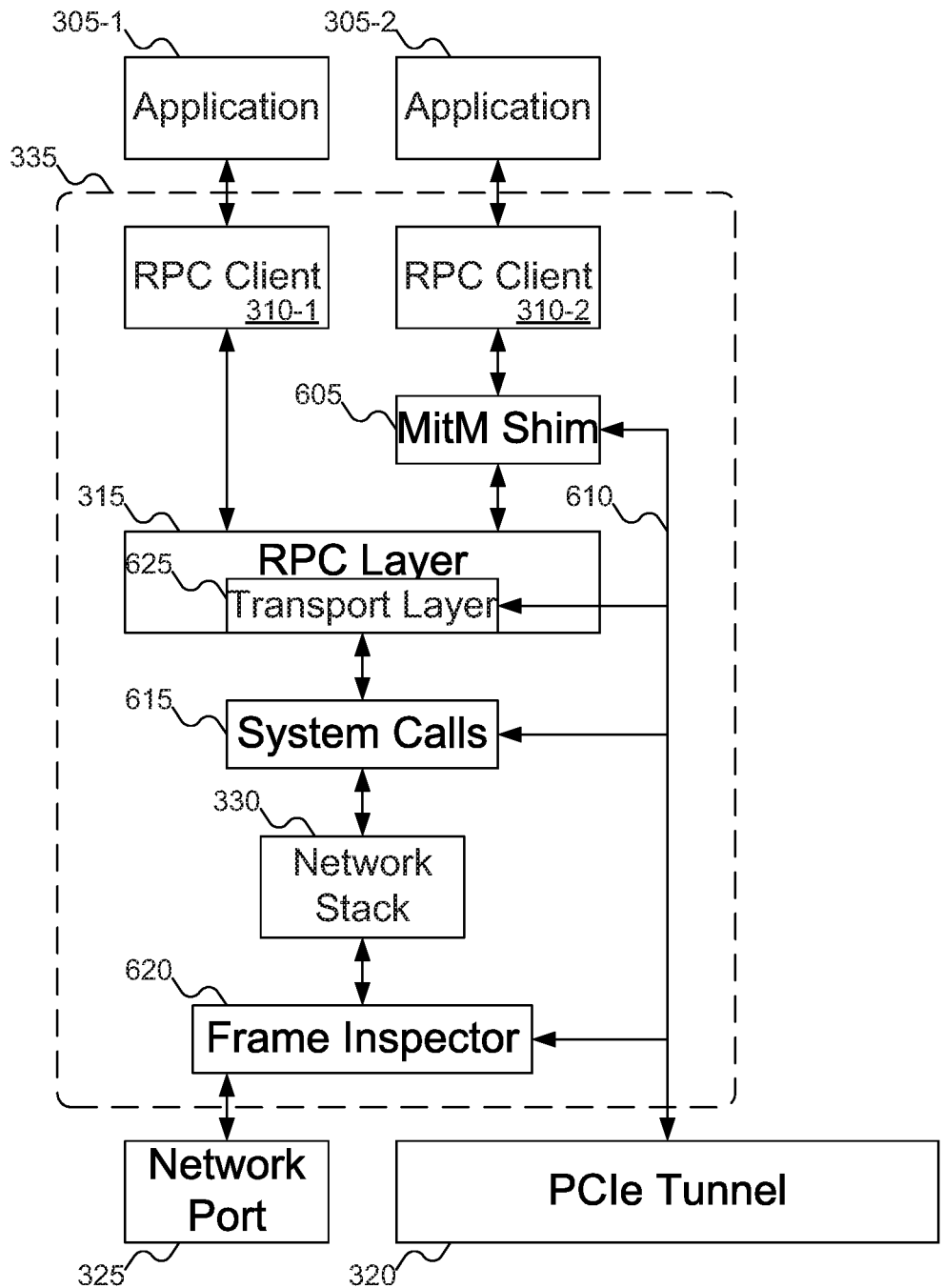
FIG. 6 shows various places in the software stack of FIG. 3 where an RPC issued by the application of FIG. 3 may be captured.

FIG. 6 shows various places in the software stack of FIG. 3 where RPC 405 of FIG. 4 issued by application 305-1 of FIG. 3 may be captured. In FIG. 6, the software stack of FIG. 3 is shown again, but this time with some possible implementations of RPC capture module 505 of FIG. 5.

In some embodiments of the inventive concept, RPC capture module 505 of FIG. 5 may be implemented as Man-in-the-Middle (MitM) shim 605. MitM shim 605 may capture RPCs as sent out by RPC client 310-2. MitM shim 605 may then arrange for the captured RPC to be sent across PCIe tunnel 320 to NVMe SSD 225 of FIG. 2 via path 610 (which may be, for example, a PCIe bus).

An advantage of using MitM shim 605 is that RPC 405 of FIG. 4 is captured very early. This avoids the need for additional layers in the software stack (such as RPC layer 315 and network stack 330) to process RPC 405 of FIG. 4, which in turn reduces the amount of time spent processing RPC 405 of FIG. 4. A disadvantage of using MitM shim 605 is that each RPC client 310-1 and 310-2 may need its own MitM shim 605, depending on whether the RPC processed by that RPC client may be redirected to NVMe SSD 225 of FIG. 2 over PCIe tunnel 320, leading to a multiplicity of code (there could be as many copies of MitM shim 605 as there are RPC clients).

In other embodiments of the inventive concept, RPC capture module 505 of FIG. 5 may be implemented using system calls 615. These system calls, such as Socket( ), Sendmsg( ), and Rescvmsg( ), may be modified to support directing various RPCs to NVMe SSD 225 of FIG. 2 via path 610.

In some embodiments of the inventive concept, the system calls in question may be re-implemented to replace their original definitions with new definitions. These re-implemented system calls may then be linked into the operating system to be used in place of the original implementations. For example, in the Linux operating system, the LD_PRELOAD environmental variable may be used to specify where the replacement libraries are located, to fetch the re-implemented versions of the system calls. These implementations avoid the need to change the applications or to rebuild the operating system, at the cost of having the re-implemented system calls being able to handle all RPCs correctly (since some may be redirected to NVMe SSD 225 of FIG. 2 over PCIe tunnel 320 and others may be sent out over network port 325 as in conventional systems).

In other embodiments of the inventive concept, the system calls in question may be "wrapped". That is, new system calls may be defined, which are called first by the operating system. These new system calls then determine whether to invoke the original system calls or special system calls that send RPC 405 of FIG. 4 over PCIe tunnel 320. These implementations require less coding, since the original system calls are still used, but require the operating system to be rebuilt (since the wrappers should be called instead of the original system calls).

In yet other embodiments of the inventive concept, RPC capture module 505 of FIG. 5 may be implemented as frame inspector 620. Frame inspector 620 may examine Ethernet frames as generated by network stack 330, identify the frames that include RPC 405 of FIG. 4, and send those frames over PCIe tunnel 320 via path 610; frames that do not include RPC 405 of FIG. 4 may be sent to network port 325 as normal. Frame inspector may "unpack" the frames to remove various protocols that have wrapped the RPC to determine whether an individual frame relates to RPC 405 of FIG. 4.

An advantage of frame inspector 620 is that very few changes need to be made to the software stack to implement RPC capture module 505. A disadvantage of frame inspector 620 is that every frame should be inspected to determine if it includes an RPC, which may slow down processing of data that does not include RPC 405 of FIG. 4 that is to be redirected to NVMe SSD 225 of FIG. 2 over PCIe tunnel 320, and RPC 405 of FIG. 4 would have undergone processing by numerous levels in the software stack, increasing the response latency for RPC 405 of FIG. 4.

In yet other embodiments of the inventive concept, RPC capture module 505 of FIG. 5 may be implemented as new transport layer 625. That is, an entirely new transport layer may be defined to handle RPC 405 of FIG. 4 to be redirected to NVMe SSD 225 of FIG. 2 over PCIe tunnel 320 via path 610. An example of commands that may be defined to implement new transport layer 625 is shown in Table 1 above.

An advantage of using new transport layer 625 is that RPC 405 of FIG. 4 may be captured fairly high in the software stack, reducing the response latency of NVMe SSD 225 of FIG. 2 to process RPC 405 of FIG. 4. A disadvantage of using new transport layer 625 is that RPC clients 310-1 and 310-2 may need to be modified to use new transport layer 625, thereby modifying the software stack in ways beyond just RPC capture module 505 of FIG. 5.

While FIG. 6 shows all the various embodiments of the inventive concept communicating with PCIe tunnel 320 via a single path 610, embodiments of the inventive concept may use different paths to send RPC 405 of FIG. 4 to PCIe tunnel 320. FIG. 6 should not be construed as implying that there is only one path 610 to reach PCIe tunnel 320 and that all embodiments of the inventive concept should use that single path 610.

As mentioned above, the software stack may include multiple points at which RPC 405 of FIG. 4 may be captured. Thus, the software stack shown in FIG. 6 may include any or all of the described implementations for RPC capture module 505 of FIG. 5 (and potentially other implementations not specifically described above). As RPC capture module 505 may wrap RPC 405 of FIG. 4 as captured at a number of different points in the software stack, RPC capture module 505 may wrap any number of different data forms into a message for transmission over PCIe tunnel 320 of FIG. 3.

Further, as discussed above with reference to FIG. 3, NVMe SSD 225 of FIG. 2 may include its own software stack that mirrors the software stack shown in FIG. 3. Therefore, NVMe SSD 225 of FIG. 2 may include analogous elements corresponding to how RPC capture module 505 is implemented, to help insert result 410 of FIG. 4 of RPC 405 of FIG. 4 back into the software stack in server 105 of FIG. 3 in the appropriate location. These elements added to the software stack of NVMe SSD 225 of FIG. 2 are not shown in FIG. 6, but are understood to correspond appropriately to the elements shown in FIG. 6 and described above.

Figure 7:
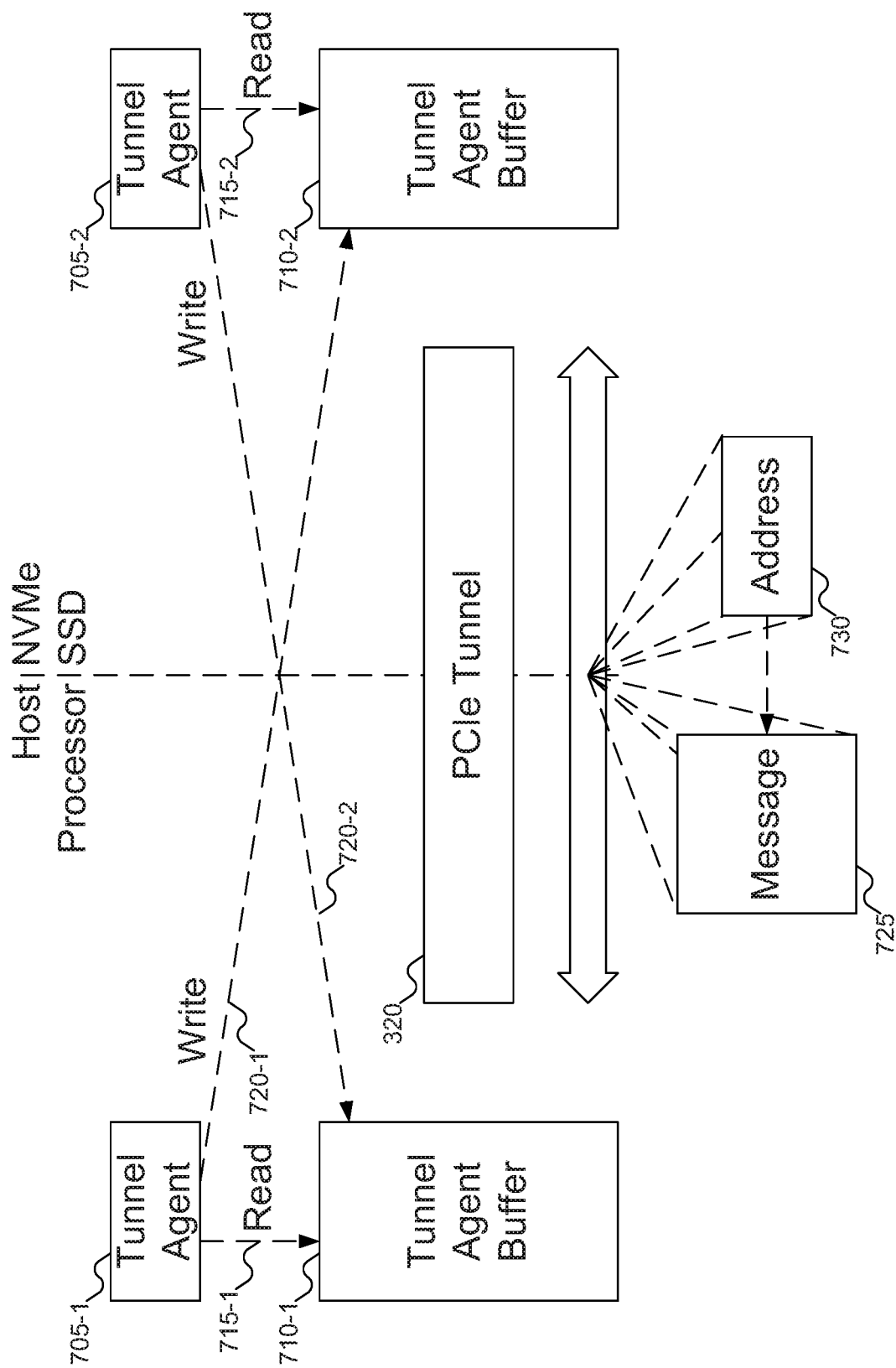
FIG. 7 shows tunnel agents and tunnel agent buffers being used to communicate across the PCIe tunnel of FIG. 3.

FIG. 7 shows tunnel agents and tunnel agent buffers being used to communicate across PCIe tunnel 320 of FIG. 3. In FIG. 7, PCIe tunnel 320 is shown again connecting host processor 205 of FIG. 2 with NVMe SSD 225 of FIG. 2. On each side of PCIe tunnel 320 is a tunnel agent: tunnel agent 705-1 is shown on the side of host processor 205 of FIG. 2, and tunnel agent 705-2 is shown on the side of NVMe SSD 225 of FIG. 2. Note that the operations of tunnel agents 705-1 and 705-2 are identical (if operating in mirror image from each other), and therefore may be implemented using a common software and/or hardware base.

Each side of PCIe tunnel 320 also includes a tunnel agent buffer: tunnel agent buffer 710-1 is shown on the side of host processor 205 of FIG. 2, and tunnel agent buffer 710-2 is shown on the side of NVMe SSD 225 of FIG. 2. Tunnel agent buffers 710-1 and 710-2 are the mechanism by which messages are passed across PCIe tunnel 320. As will be discussed further below, tunnel agent buffers 710-1 and 710-2 may or may not be physically located on the respective sides of PCIe tunnel 320, but may be used as though they were located as shown. Tunnel agent buffers 710-1 and 710-2 may be implemented as storage that may be read and written: for example, as memory or other storage. Tunnel agent buffers 710-1 and 710-2 may be implemented using any desired approach, but keeping in mind the objective that messages be passed in-order a First In, First Out (FIFO) queue is desirable, which may be implemented, for example, using a ring buffer.

It is worth understanding that while tunnel agents 705-1 and 705-2 are aware of each other, they operate partially independently of each other. That is, either tunnel agent may read from or write messages to tunnel agent buffers 710-1 and 710-2, as long as tunnel agent buffers 710-1 and 710-2 are capable of performing the reads and writes. For example, if there are no message to read in the tunnel agent buffer, the tunnel agent may not read any messages, and if the tunnel agent buffer is full, the tunnel agent may not write new messages.

From the perspective of one side of PCIe tunnel 320, the tunnel agent and the tunnel agent buffer on that side of PCIe tunnel 320 may be termed the local tunnel agent and the local tunnel agent buffer, and the tunnel agent and the tunnel agent buffer on the other side of PCIe tunnel 320 may be termed the remote tunnel agent and the remote tunnel agent buffer. Thus, for example, on the side of host processor 205 of FIG. 2, tunnel agent 705-1 and tunnel agent buffer 710-1 are local, and tunnel agent 705-2 and tunnel agent buffer 710-2 are remote, whereas the reverse is true on the side of NVMe SSD 225 of FIG. 2. Thus, the terms "local" and "remote" are relative to the side of PCIe tunnel 320 from which the system is viewed. Nor should "local" necessarily be considered to mean "internal to". For example, as discussed below with reference to FIG. 9, on the host side of PCIe tunnel 320, a shared buffer model of PCIe tunnel 320 may be used, where both tunnel agent buffers 710-1 and 710-2 are physically within the same memory. But even though the tunnel agent buffer that is "local" to a particular tunnel agent might be physically located on the "remote" side of PCIe tunnel 320, that tunnel buffer should still be understood to be "local".

Each tunnel agent 705-1 and 705-2 includes two pointers into tunnel agent buffers 710-1 and 710-2: one pointer is used for reading messages from the local tunnel agent buffer, and the other pointer is used for writing messages to the remote tunnel agent buffer. These pointers may be labeled based on whether they are used to read or write messages, and whether they point into the local or remote tunnel agent buffer. Thus, using the labels shown in Table 2 above and using the perspective of tunnel agent 705-1, pointer 715-1 is pointer $R_L$, pointer 715-2 is pointer $R_R$, pointer 720-1 is pointer $W_R$, and pointer 720-2 is pointer $W_L$. On the other hand, from the perspective of tunnel agent 705-2, pointer 715-2 is pointer $R_L$, pointer 715-1 is pointer $R_R$, pointer 720-2 is pointer $W_R$, and pointer 720-1 is pointer $W_L$. Both tunnel agents may access the values of pointers "owned" by the other tunnel agent. From this point forward, the pointers will be referred to by their labels rather than their figure reference numbers.

Now consider tunnel agent 705-1. Tunnel agent 705-1 may check to see if there are any messages to read from (local) tunnel agent buffer 710-1 by comparing the values of pointers $R_L$ and $W_L$: if the values are equal, there are no messages to be read. Otherwise, tunnel agent 705-1 may read a message and update $R_L$ (based on the size of the message).

If tunnel agent 705-1 wants to write a message to (remote) tunnel agent buffer 710-2, tunnel agent 705-1 may check to see if there is space to write the message by comparing the values of pointers RR and WR: if the size of tunnel agent buffer 710-2, less the amount of space occupied by pending messages (mathematically, $SIZE_{RTAB}-(W_R-R_R)$) modulo $SIZE_{RTAB}$), is less than the size of the message tunnel agent 705-1 wants to write, there is insufficient room to write the message. Otherwise, tunnel agent 705-1 may write a message and update $W_R$. (Tunnel agent 705-2 operates identically, but using different pointers due to which tunnel agent buffer is considered local and which is considered remote.)

In terms of the messages themselves, there are two different ways that may be used to send the messages. In some embodiments of the inventive concept, the local tunnel agent may write message 725 (in full) into the remote tunnel agent buffer. But since messages might vary in size, this approach requires a more complicated approach to determining whether the remote tunnel agent buffer has capacity for any individual message. In other embodiments of the inventive concept, the local tunnel agent may write message 725 to some other shared location, and then write address 730 into the remote tunnel agent buffer. Because address 730 has a predictable (and generally fixed) size, determining whether the remote tunnel agent buffer has capacity for another message because a simpler comparison of whether $(W_R+SIZE_{Message})==R_R$ (modulo the size of the remote tunnel agent buffer), at the cost of the added complexity to dereference message 725 from address 730. (Of course, if messages are always fixed in size, then the simpler equation may be used even when message 725 is placed directly in the remote tunnel agent buffer.)

Figure 8:
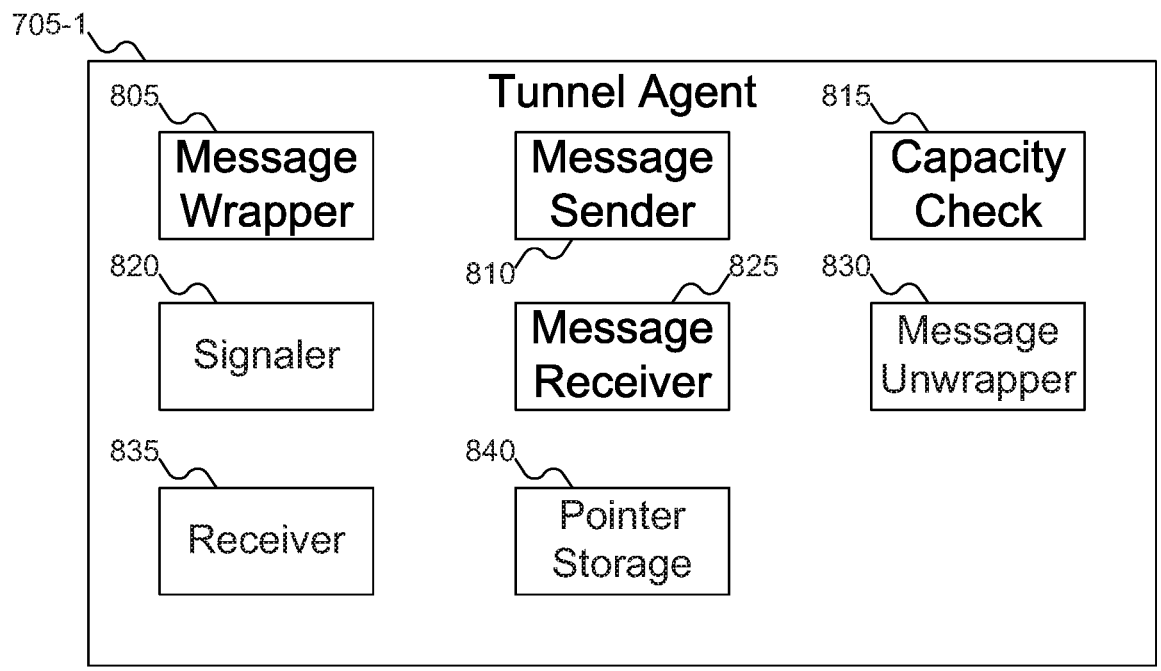
FIG. 8 shows details of the tunnel agent of FIG. 7.

FIG. 8 shows details of tunnel agent 705-1 of FIG. 7. In FIG. 8, tunnel agent buffer 705-1 is shown as including message wrapper 805, message sender 810, capacity check 815, signaler 820, message receiver 825, message unwrapper 830, receiver 835, and pointer storage 840. Message wrapper 805 may wrap a message for delivery across PCIe tunnel 320 of FIG. 3. For example, if the message includes RPC 405 of FIG. 4 requested by application 305-1 of FIG. 3, message wrapper 805 may store RPC 405 of FIG. 4 in its own data structure, with appropriate header information (for example, specifying at what point RPC capture module 505 of FIG. 5 captured RPC 405 of FIG. 4, or which microservice 340-1 or 340-2 is intended to execute RPC 405 of FIG. 4). Message sender 810 may place the message in the remote tunnel agent buffer. Message sender 810 may also be responsible for verifying that the remote tunnel agent buffer has the capacity for the message, using capacity check 815 (as described above); if the remote tunnel agent buffer does not have the capacity for the message, message sender 810 may wait to send the message (and any subsequent messages waiting to be sent) until the remote tunnel agent buffer has the capacity to store the message. Finally, in some embodiments of the inventive concept, (local) tunnel agent 705-1 may include signaler 820 to signal (remote) tunnel agent 705-2 of FIG. 7 that a new message has been placed in (remote) tunnel agent buffer 710-2 of FIG. 7. For example, signaler 820 may send an interrupt signal to the (remote) tunnel agent that a new message is waiting to be read.

Message receiver 825 may read a message from the local tunnel agent buffer. Message unwrapper 830 may unwrap the read message to extract the content. For example, if the message is result 410 of FIG. 4, message unwrapper may extract result 410 of FIG. 4 from the message and deliver result 410 of FIG. 4 to application 305-1 of FIG. 3 as though host processor 205 of FIG. 2 had executed RPC 405 of FIG. 4. Finally, in some embodiments of the inventive concept, (local) tunnel agent 705-1 may include receiver 835 to receive a signal from (remote) tunnel agent 705-2 of FIG. 7 when a new message has been placed in (local) tunnel agent buffer 710-1 of FIG. 7. If receiver 835 is not included, tunnel agent 705-1 may poll the local tunnel agent buffer periodically (at any desired interval) to see if there is a new message to read.

Finally, pointer storage 840 may store the values of the local pointers "owned" by tunnel agent 705-1.

Figure 9:
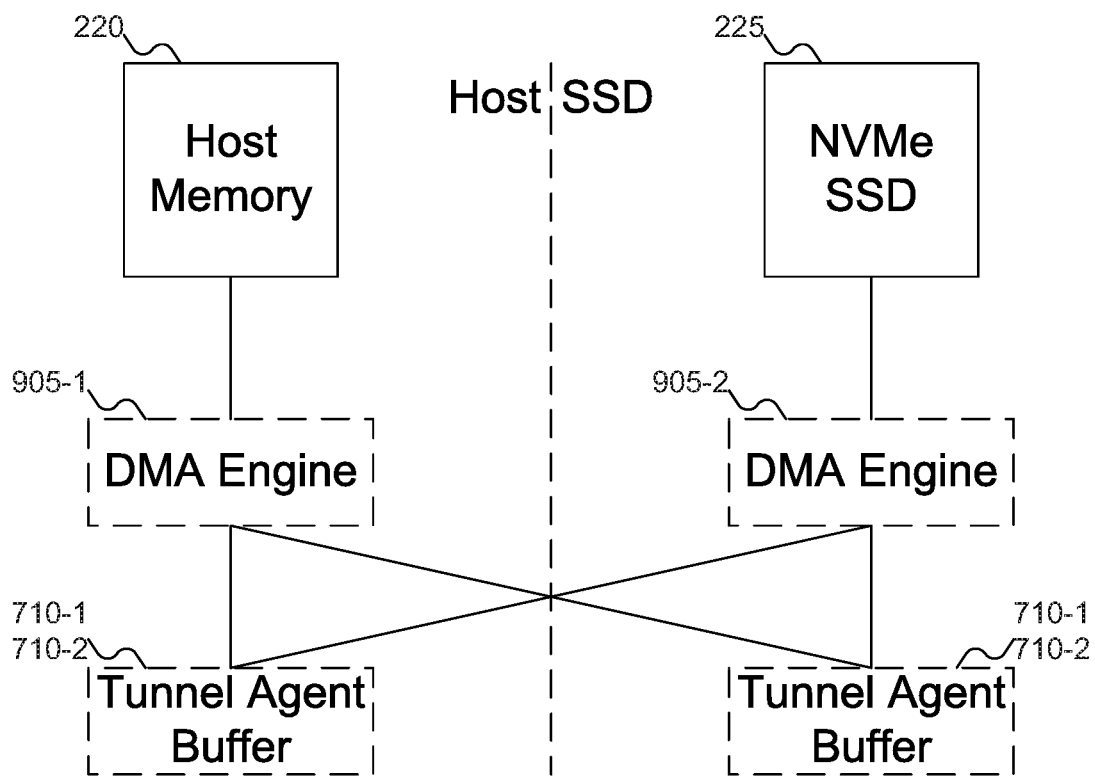
FIG. 9 shows possible placements for DMA engines and the tunnel agent buffers of FIG. 7.

FIG. 9 shows possible placements for tunnel agent buffers 710-1 and 710-2 of FIG. 7. As discussed above with reference to FIG. 7, tunnel agent buffers 710-1 and 710-2 are considered to be local to the relative sides of PCIe tunnel 320 of FIG. 3, but they do not have to be physically located on that side. In some embodiments of the inventive concept, tunnel agent buffers 710-1 and 710-2 may both be physically on the same side of PCIe tunnel 320 of FIG. 3, even though they are logically considered to be on separate sides of PCIe tunnel 320 of FIG. 3. For example, NVMe SSD 225 may include a memory (shown in FIG. 10, below) that supports a shared buffer that includes both tunnel agent buffers 710-1 and 710-2: that is, the shared buffer may be read from and written to by both tunnel agent 705-2 (on NVMe SSD 225) and tunnel agent 705-1 (on the side of host processor 205 of FIG. 2).

The side that includes the shared buffer may read from and write to the shared buffer directly without any complications. The other side, on the other hand, may use a Direct Memory Access (DMA) engine to access the shared buffer (either to read messages from the local tunnel agent buffer or to write messages to the remote tunnel agent buffer). Thus, if the shared buffer is included in NVMe SSD 225, host processor 205 of FIG. 2 may include DMA engine 905-1 to access the shared buffer; if the shared buffer is included in memory 220, NVMe SSD 225 may include DMA engine 905-2 to access the shared buffer.

If the shared buffer is in a memory that is part of NVMe SSD 225, host processor 205 of FIG. 2 may bear the burden of moving all messages between host processor 205 of FIG. 2 and NVMe SSD 225. This arrangement may not be optimal, since it places an additional burden on host processor 205 of FIG. 2. Instead, by placing the shared buffer in (host) memory 220, host processor 205 of FIG. 2 is relieved of the burden of performing PCIe transactions to move messages, freeing host processor 205 of FIG. 2 to perform other tasks.

It may also be possible to have the shared buffer and the DMA engine 905-1 and/or 905-2 on the same side of PCIe tunnel 320 of FIG. 3. That is to say, DMA engine 905-1 and/or 905-2 may be located on either side of PCIe tunnel 320 of FIG. 3, independent of the physical location of the shared buffer. For example, the shared buffer and DMA engine 905-2 may both be part of NVMe SSD 225, in which case NVMe SSD 225 may be responsible for using DMA engine 905-2 to move messages to memory 220 of FIG. 2 for use by host processor 205 of FIG. 2.

Figure 10:
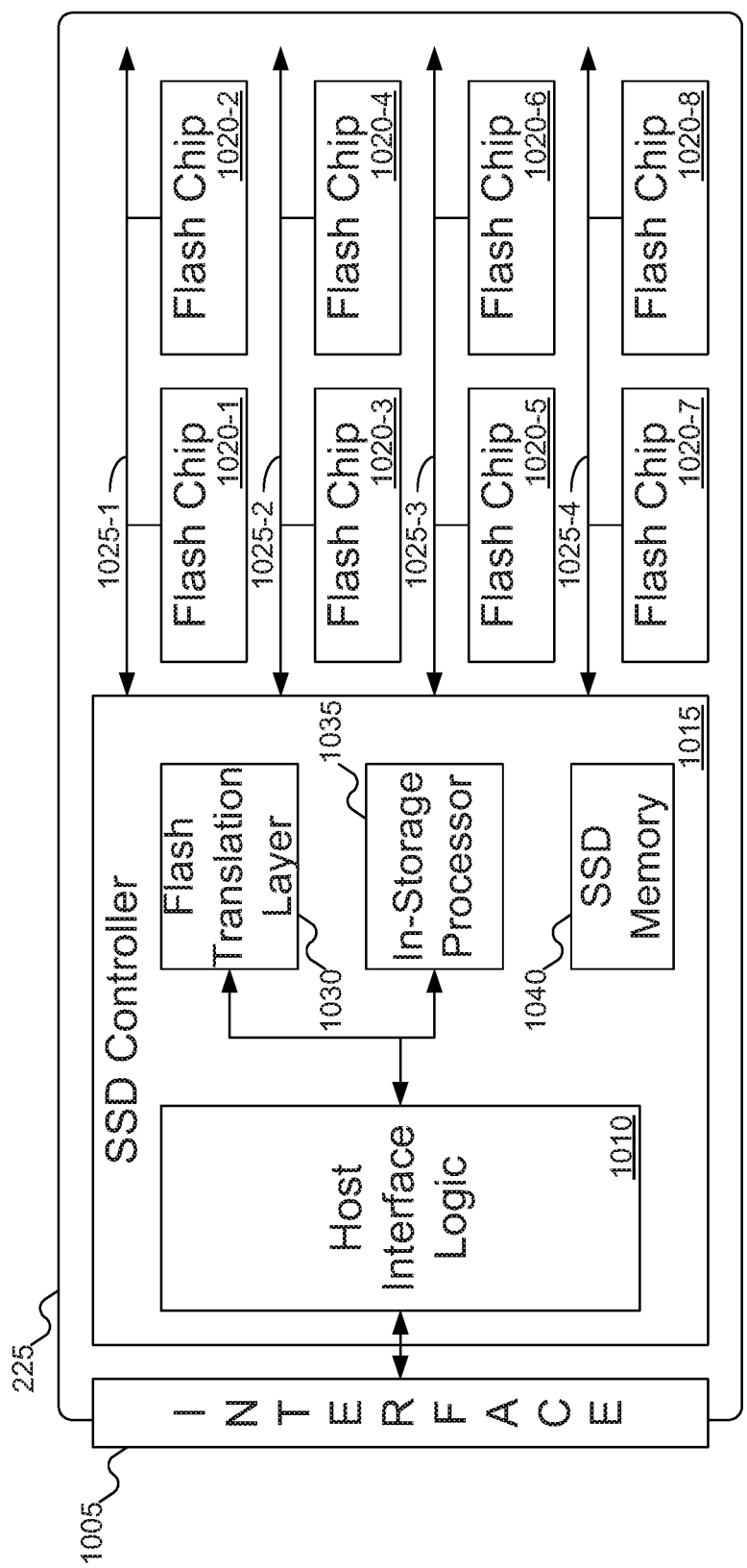
FIG. 10 shows various components in the Non-Volatile Memory Express (NVMe) Solid State Drive (SSD) of FIG. 2.

FIG. 10 shows various components in NVMe SSD 225 of FIG. 2. In FIG. 10, NVMe SSD 225 may include interface 1005, host interface logic 1010, SSD controller 1015, and various flash memory chips 1020-1 through 1020-10, which may be organized into various channels 1025-1 through 1025-4. Interface 1005 may be the physical interface to server 105 of FIG. 1: specifically, the PCIe connection point on NVMe SSD 225. Host interface logic 1010 may manage communications between NVMe SSD 225 and Server 105 of FIG. 1. SSD controller 1015 may manage the read and write operations, along with garbage collection and other operations, on flash memory chips 1020-1 through 1020-8. While FIG. 10 shows NVMe SSD 225 as including eight flash memory chips 1020-1 through 1020-8 organized into four channels 1025-1 through 1025-4, embodiments of the inventive concept may support any number of flash memory chips organized into any number of channels. SSD controller 1015 may include flash translation layer 1030. Flash translation layer 1030 may perform the conventional functions of translating logical block addresses (LB As), as used by server 105 of FIG. 1, into physical block addresses (PBAs) of data stored in NVMe SSD 225.

SSD controller 1015 may also include in-storage processor 1035. In-storage processor may be any variety of processor, as described above, and may execute micro-services 340-1 and 340-2 of FIG. 3 offered by NVMe SSD 225. While FIG. 10 shows in-storage processor 1035 as part of SSD controller 1015, embodiments of the inventive concept may include in-storage processor being located anywhere within NVMe SSD 225.

Finally, SSD controller 1015 may include memory 1040. As discussed above with reference to FIG. 10, NVMe SSD 225 may include memory to store tunnel agent buffers 710-1 and/or 710-2 of FIG. 7: memory 1040 may be used to store tunnel agent buffers 710-1 and/or 710-2 of FIG. 7. And in the event that tunnel agent buffer 710-2 is hosted in memory 220 of FIG. 2, SSD controller 1015 may also include DMA engine 905-2 of FIG. 9 (not shown in FIG. 10), to facilitate moving messages across PCIe tunnel 320 of FIG. 3 between tunnel agent buffers 710-1 and 710-2 of FIG. 7.

Figure 11:
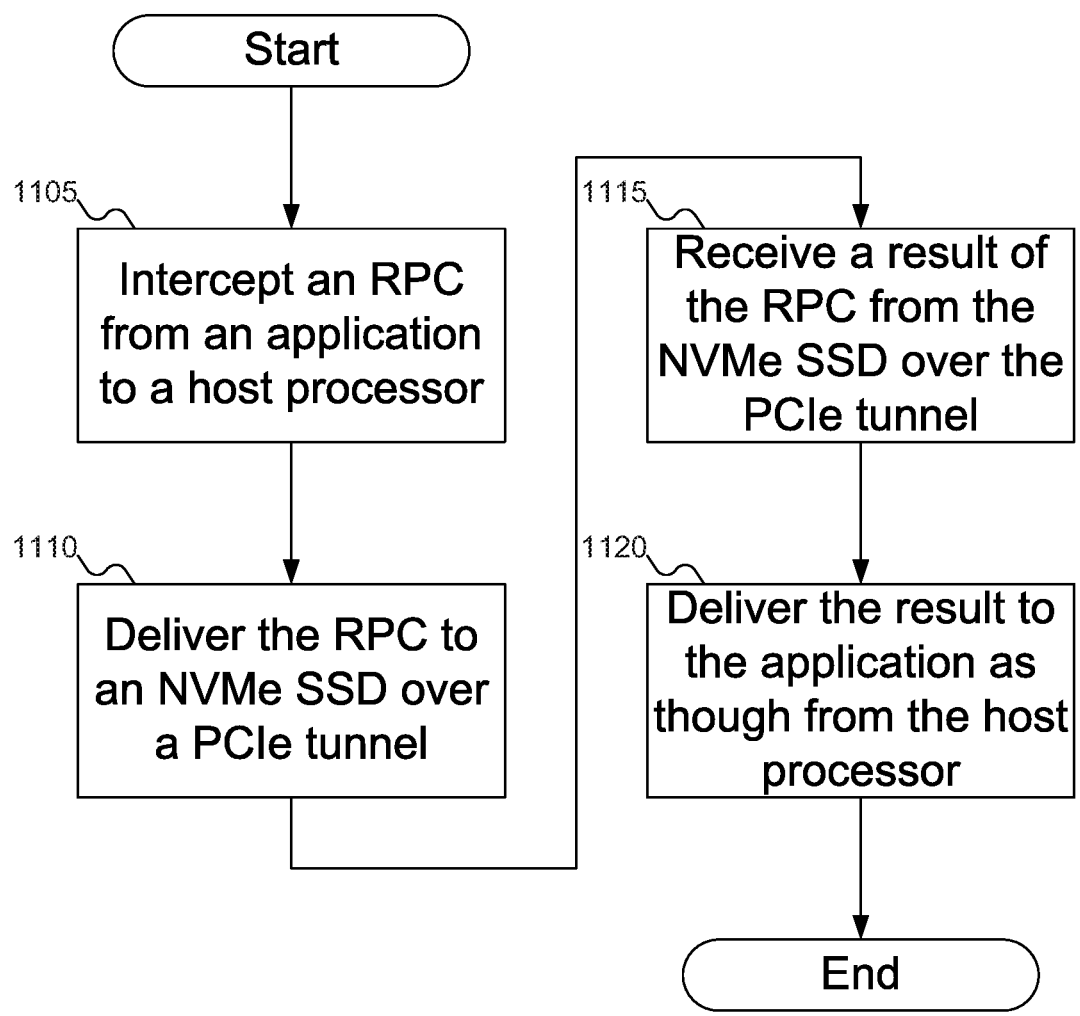
FIG. 11 shows a flowchart of an example procedure for the server of FIG. 1 to intercept an RPC from the application of FIG. 3 and send it to the NVMe SSD of FIG. 2, according to an embodiment of the inventive concept.

FIG. 11 shows a flowchart of an example procedure for server 105-1 of FIG. 1 to intercept RPC 405 of FIG. 4 from application 305-1 of FIG. 3 and send it to NVMe SSD 225 of FIG. 2, according to an embodiment of the inventive concept. In FIG. 11, at block 1105, RPC capture module 505 of FIG. 5 may capture RPC 405 of FIG. 4 sent by application 305-1 of FIG. 3 and deliver RPC 405 of FIG. 4 to tunnel agent 705-1 of FIG. 7. At block 1110 tunnel agent 705-1 of FIG. 7 may deliver RPC 405 of FIG. 4 as message 705 of FIG. 7 to tunnel agent 705-1 of FIG. 7. At block 1115, tunnel agent 705-1 of FIG. 7 may receive from tunnel agent 705-2 of FIG. 7 result 410 of FIG. 4 to RPC 405 of FIG. 4. At block 1120, tunnel agent 1120 may deliver result 410 of FIG. 4 to application 305-1 of FIG. 3, as though host processor 205 of FIG. 2 had executed RPC 405 of FIG. 4.

Figure 12A:
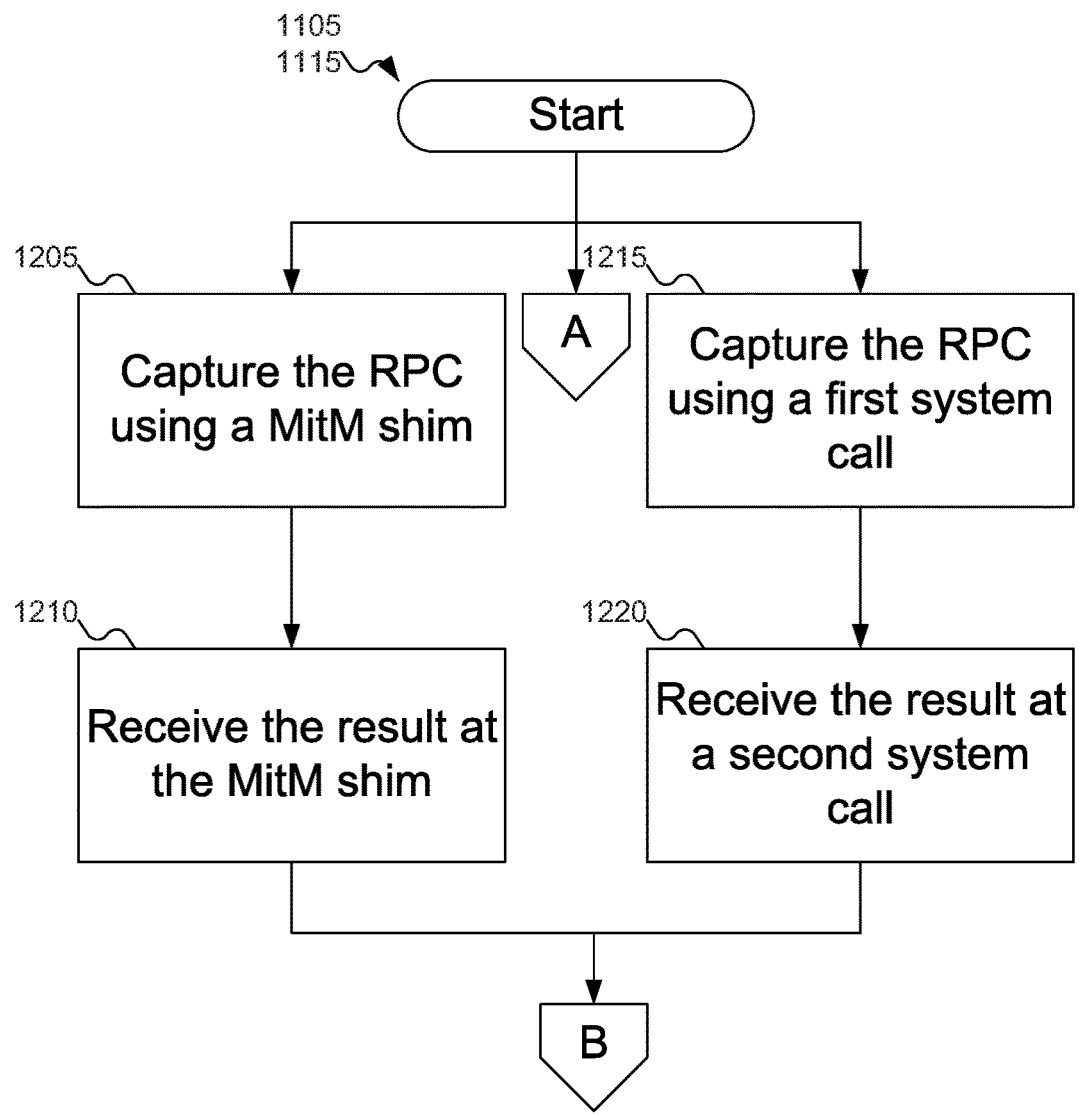
FIGS. 12A-12B show a flowchart of an example procedure for the server of FIG. 1 to capture an RPC from the application of FIG. 3.
Figure 12B:
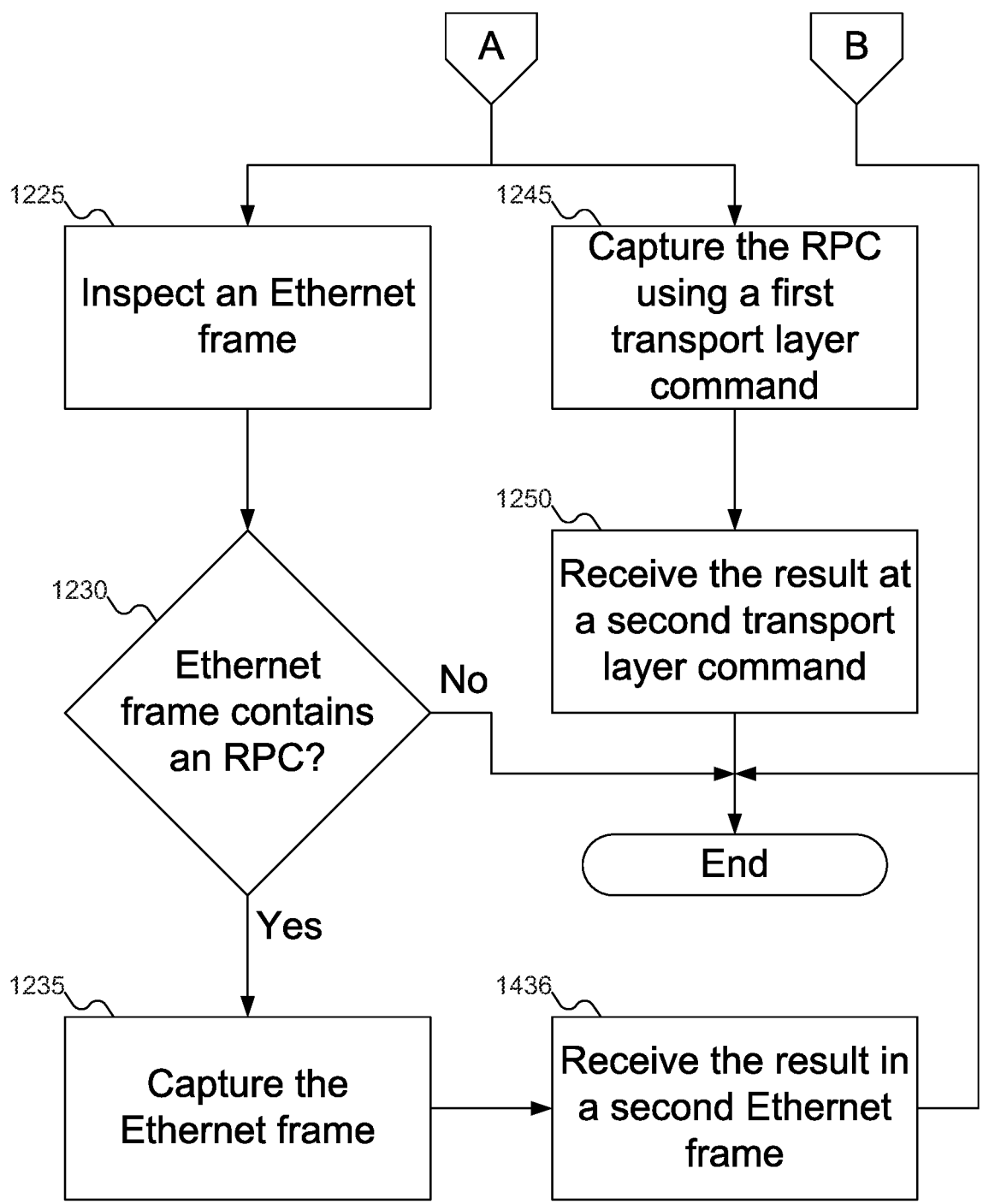

FIGS. 12A-12B show a flowchart of an example procedure for server 105-1 of FIG. 1 to capture RPC 405 of FIG. 4 from application 305-1 of FIG. 3. In FIG. 12A, at block 1205, MitM shim 605 of FIG. 6 may capture RPC 405 of FIG. 4 and deliver it to tunnel agent 705-1 of FIG. 7 to send across PCIe tunnel 320 of FIG. 3, and at block 1210, MitM shim 605 of FIG. 6 may receive result 410 of FIG. 4 from tunnel agent 705-1 of FIG. 7 and deliver it to application 705-1 of FIG. 7.

Alternatively, at block 1215, RPC client 310-1 of FIG. 3 may make a system call 615 of FIG. 6 may be used to invoke RPC 405 of FIG. 4, which instead may deliver RPC 405 of FIG. 4 to tunnel agent 705-1 of FIG. 7 to send across PCIe tunnel 320 of FIG. 3, and at block 1220, tunnel agent 705-1 of FIG. 7 may make another system call 615 of FIG. 6 to return result 410 of FIG. 4 to RPC client 310-1 of FIG. 3 (and thence to application 305-1 of FIG. 3).

Alternatively, at block 1225 (FIG. 12B), frame inspector 620 of FIG. 6 may inspect a frame to look for RPC 405 of FIG. 4. At block 1230, frame inspector 620 of FIG. 6 determines if the frame includes RPC 405 of FIG. 4. If not, then frame inspector 620 of FIG. 6 may put the frame on the wire (or deliver it to another layer in the software stack). But if the frame includes RPC 405 of FIG. 4, then at block 1235 frame inspector 605 of FIG. 6 may deliver the frame to tunnel agent 705-1 of FIG. 7 to send across PCIe tunnel 320 of FIG. 3. Finally, at block 1240, frame inspector 620 of FIG. 6 may find a frame containing result 410 of FIG. 4 and deliver it back up the software stack, eventually to application 305-1 of FIG. 3.

Alternatively, at block 1245, RPC client 310-1 of FIG. 3 may use a new transport layer command 625 of FIG. 6 to deliver RPC 405 of FIG. 4 to tunnel agent 705-1 of FIG. 7 to send across PCIe tunnel 320 of FIG. 3, and at block 1250, tunnel agent 705-1 of FIG. 7 may make another new transport layer command 625 of FIG. 6 to return result 410 of FIG. 4 to RPC client 310-1 of FIG. 3 (and thence to application 305-1 of FIG. 3).

Figure 13:
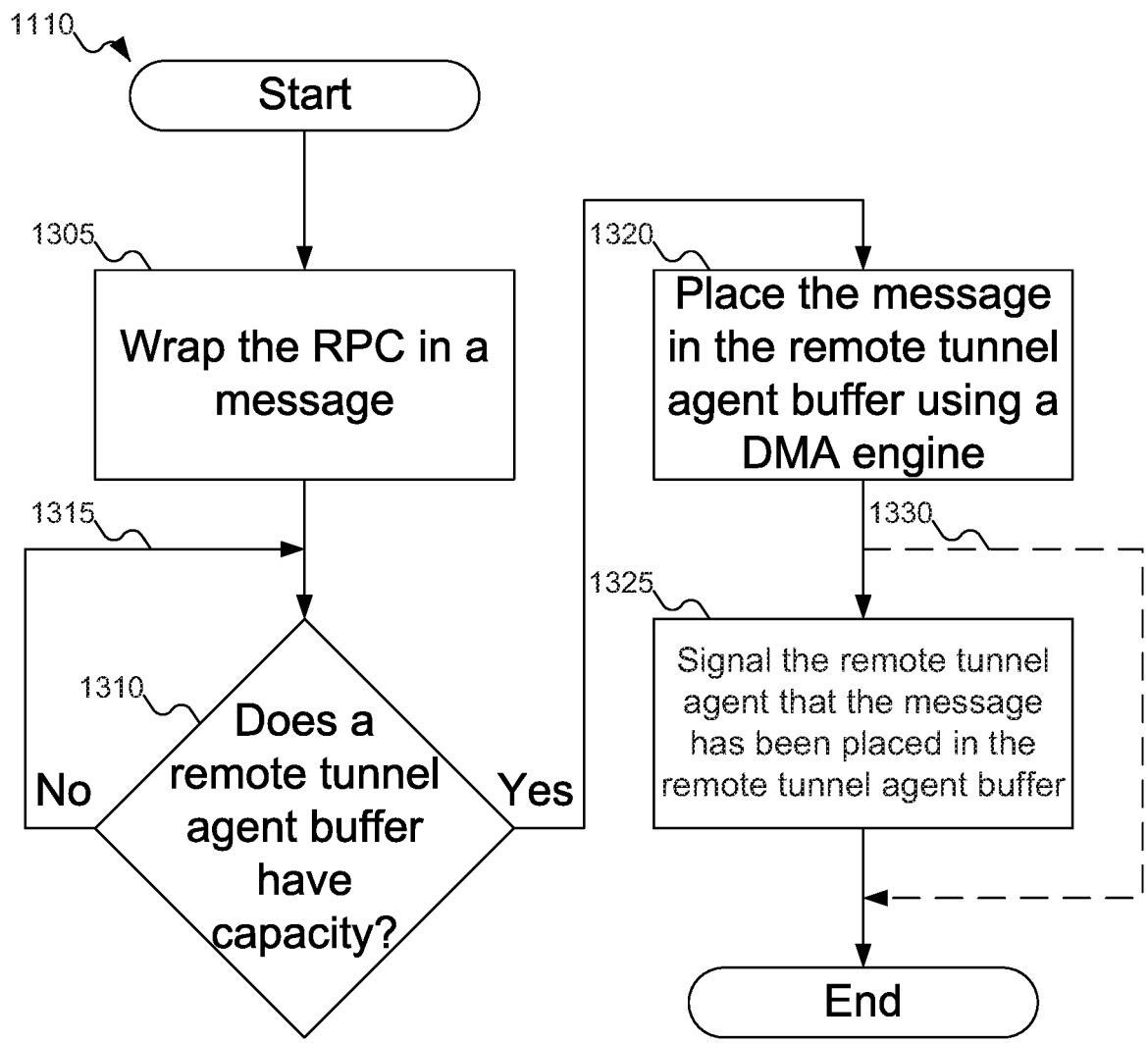
FIG. 13 shows a flowchart of an example procedure for the host tunnel agent of FIG. 7 to send a message to the NVMe SSD tunnel agent of FIG. 7.

FIG. 13 shows a flowchart of an example procedure for tunnel agent 705-1 of FIG. 7 to send message 725 of FIG. 7 to tunnel agent 705-1 of FIG. 7. Prior to FIG. 13, at some point tunnel agent 705-1 of FIG. 7 has received RPC 405 of FIG. 4 from RPC capture module 505 of FIG. 5. In FIG. 13, at block 1305, message wrapper 805 of FIG. 8 may wrap RPC 405 of FIG. 4 in message 725 of FIG. 7. At block 1310, capacity check 815 of FIG. 8 may check to verify that tunnel agent buffer 710-2 of FIG. 7 has capacity for message 725 of FIG. 7. If not, then tunnel agent 705-1 of FIG. 7 may hold message 725 of FIG. 7 until capacity check 815 of FIG. 8 determines that tunnel agent buffer 710-2 of FIG. 7 has capacity for message 725 of FIG. 7, as shown by arrow 1315. Note that holding message 725 of FIG. 7 does not imply that tunnel agent 705-1 of FIG. 7 blocks: tunnel agent 705-1 of FIG. 7 may perform other operations while waiting for tunnel agent buffer 710-2 of FIG. 7 to have capacity for message 725 of FIG. 7. For example, tunnel agent 705-1 of FIG. 7 may process messages read from tunnel agent buffer 710-1 of FIG. 7.

Once capacity check 815 of FIG. 8 determines that tunnel agent buffer 710-2 of FIG. 7 has capacity for message 725 of FIG. 7, then at block 1320 message sender 810 of FIG. 8 writes message 725 of FIG. 7 to tunnel agent buffer 710-2 of FIG. 7, and at block 1325 signaler 820 of FIG. 8 may single tunnel agent 705-2 of FIG. 7 that message 725 of FIG. 7 has been written to tunnel agent buffer 705-2 of FIG. 7. Block 1325 may be omitted, as shown by dashed line 1330.

Figure 14:
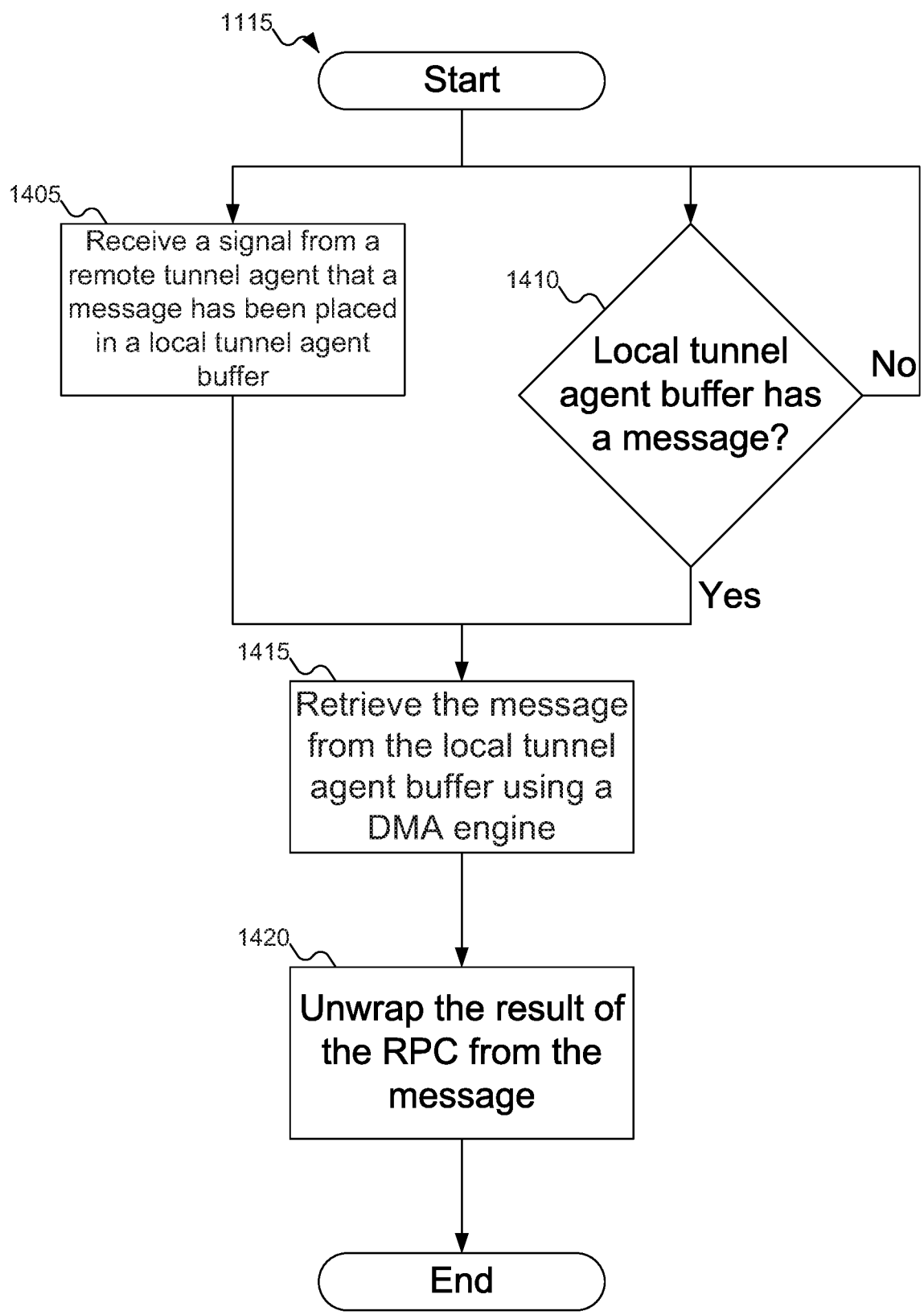
FIG. 14 shows a flowchart of an example procedure for the host tunnel agent of FIG. 7 to receive a message from the NVMe SSD tunnel agent of FIG. 7.

FIG. 14 shows a flowchart of an example procedure for tunnel agent 705-1 of FIG. 7 to receive message 725 of FIG. 7 from tunnel agent 705-2 of FIG. 7. In FIG. 14, at block 1405, receiver 835 of FIG. 8 may receive a signal from tunnel agent 705-2 of FIG. 7 that message 725 of FIG. 7 has been written to tunnel agent buffer 710-1 of FIG. 7. Alternatively, at block 1410, tunnel agent 705-1 of FIG. 7 may poll tunnel agent buffer 710-1 of FIG. 7 until tunnel agent buffer 710-1 of FIG. 7 has a message to process. Either way, at block 1415, message receiver 825 of FIG. 8 may read message 725 of FIG. 7 from tunnel agent buffer 710-1 of FIG. 7, and at block 1420 message unwrapper 830 of FIG. 8 may unwrap result 410 of FIG. 4 from message 725 of FIG. 7, after which tunnel agent 705-1 may send result 410 of FIG. 4 back towards application 305-1 of FIG. 3.

Figure 15:
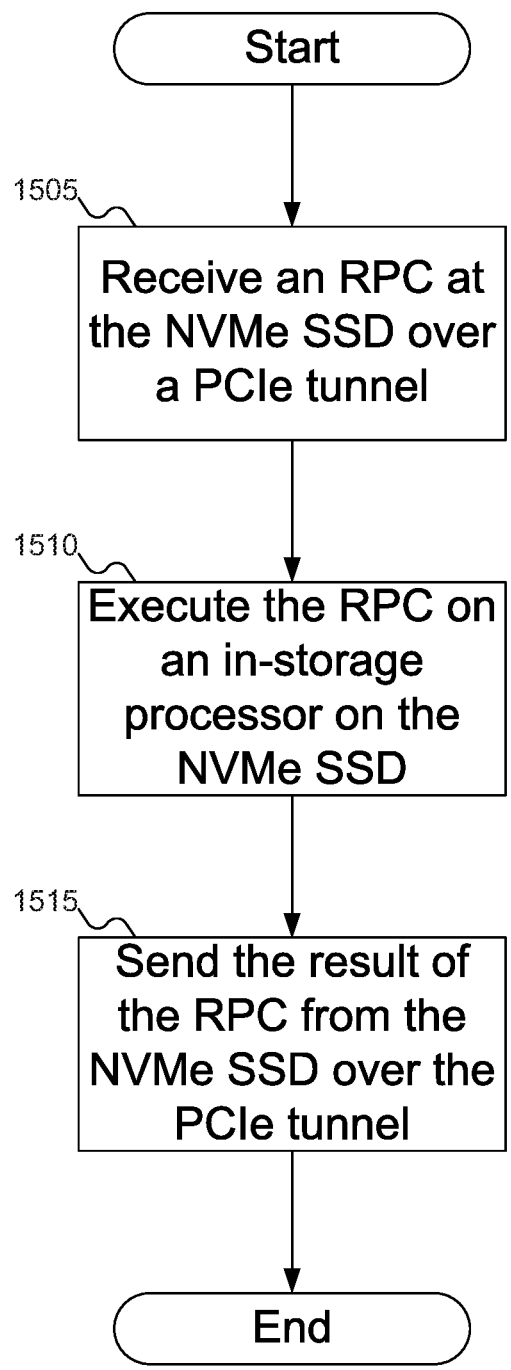
FIG. 15 shows a flowchart of an example procedure for the NVMe SSD of FIG. 2 to process an RPC from the server of FIG. 1, according to an embodiment of the inventive concept.

FIG. 15 shows a flowchart of an example procedure for NVMe SSD 225 of FIG. 2 to process RPC 405 of FIG. 4 from server 105-1 of FIG. 1, according to an embodiment of the inventive concept. In FIG. 15, at block 1505, NVMe SSD 225 of FIG. 2 may receive RPC 405 of FIG. 4 from server 105-1 of FIG. 1 over PCIe tunnel 320 of FIG. 3. At block 1510, in-storage processor 1035 of FIG. 10 may execute RPC 405 of FIG. 4 according to micro-service 340-1 or 340-2 of FIG. 3. Finally, at block 1515, NVMe SSD 225 of FIG. 2 may send result 410 of FIG. 4 back to server 105-1 of FIG. 1 over PCIe tunnel 320 of FIG. 3.

Figure 16A:
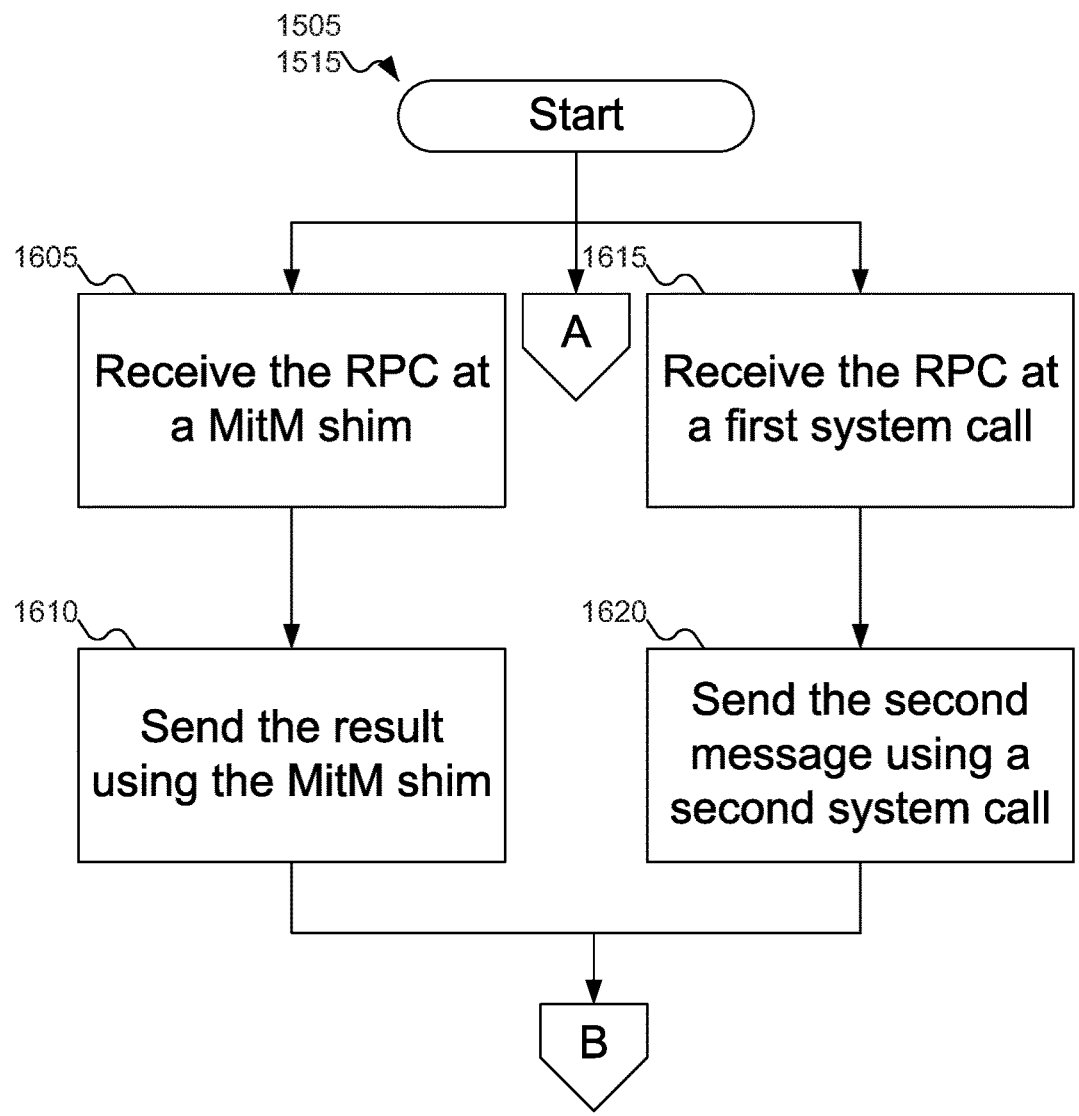
FIGS. 16A-16B show a flowchart of an example procedure for the NVMe SSD of FIG. 2 to receive an RPC over the PCIe tunnel of FIG. 3.
Figure 16B:
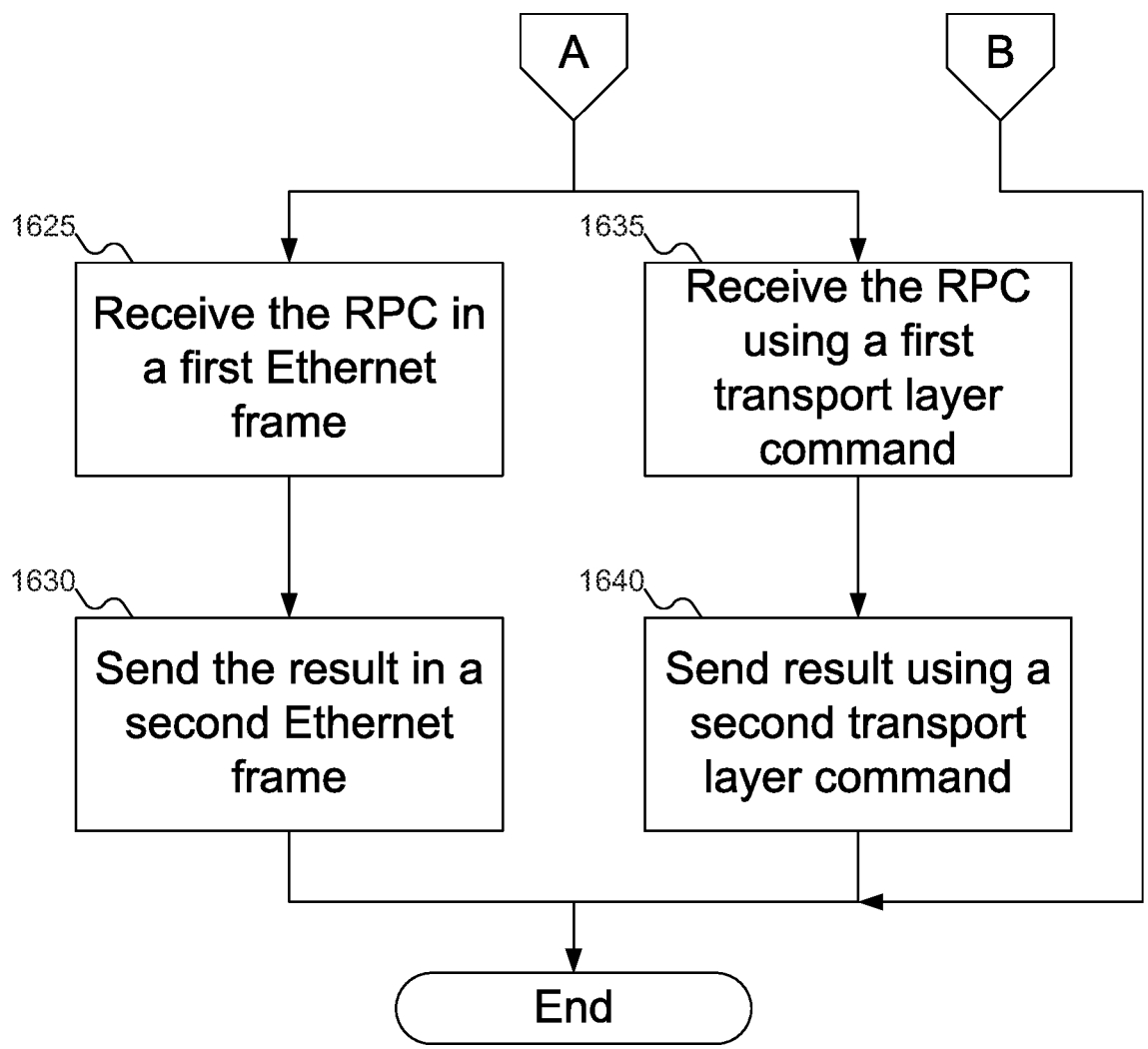

FIGS. 16A-16B show a flowchart of an example procedure for NVMe SSD 225 of FIG. 2 to receive RPC 405 of FIG. 4 over PCIe tunnel 320 of FIG. 3. As discussed above with reference to FIG. 3, NVMe SSD 225 of FIG. 2 may have components corresponding to those shown in the software stack of server 105-1 of FIG. 1 to process messages received across PCIe tunnel 320 of FIG. 3: references to such components that would be in NVMe SSD 225 of FIG. 2 are assigned the same figure reference numbers below as those in the software stack of server 105-1 of FIG. 1.

In FIG. 16A, at block 1605, tunnel agent 705-2 of FIG. 7 may receive message 725 of FIG. 7 containing RPC 405 of FIG. 4 over PCIe tunnel 320 of FIG. 3 and deliver RPC 405 of FIG. 4 to MitM shim 605 of FIG. 6. Then, at block 1610, MitM shim 605 of FIG. 6 may send result 410 of FIG. 4 to tunnel agent 705-2 of FIG. 7 so that tunnel agent 705-2 of FIG. 7 may wrap result 410 of FIG. 4 in message 725 of FIG. 7 and send message 725 of FIG. 7 back over PCIe tunnel 320 of FIG. 3.

Alternatively, at block 1615, RPC server 345-1 of FIG. 3 may receive a system call 615 of FIG. 6 from tunnel agent 705-2 of FIG. 7 used to invoke micro-service 340-1 of FIG. 3 to execute RPC 405 of FIG. 4, which tunnel agent 705-2 of FIG. 7 received as message 725 of FIG. 7 over PCIe tunnel 320 of FIG. 3. Then, at block 1620, RPC server 345-1 of FIG. 3 may make another system call 615 of FIG. 6 to return result 410 of FIG. 4 to tunnel agent 705-2 of FIG. 7 for wrapping in message 725 of FIG. 7 to be sent over PCIe tunnel 320 of FIG. 3.

Alternatively, at block 1625 (FIG. 16B), frame inspector 620 of FIG. 6 may receive a frame from tunnel agent 705-2 of FIG. 7 containing RPC 405 of FIG. 4, which frame was wrapped in message 725 of FIG. 7 and received over PCIe tunnel 320 of FIG. 3. Then, at block 1630, frame inspector 620 of FIG. 6 may send a frame containing result 410 of FIG. 4 to tunnel agent 705-2 of FIG. 7 to be wrapped in message 725 of FIG. 7 and sent over PCIe tunnel 320 of FIG. 3.

Note that, as compared with the software stack of server 105-1 of FIG. 1, NVMe SSD 225 of FIG. 2 does not normally send or receive Ethernet frames (since NVMe SSD 225 of FIG. 2 normally does not send or receive Ethernet data or even have an Ethernet port), so frame inspector 620 of FIG. 6, when part of NVMe SSD 225 of FIG. 2, does not need to inspect Ethernet frames: they all contain either RPC 405 of FIG. 4 or result 410 of FIG. 4. However, in embodiments of the inventive concept where NVMe SSD 225 of FIG. 2 supports Ethernet communication directly, frame inspector 620 as described in blocks 1625 and 1630 may be modified to operate similarly to frame inspector 620 of FIG. 6 when operating within server 105-1 of FIG. 1 (as described above with reference to FIG. 12B).

Alternatively, at block 1635, RPC server 345-1 of FIG. 3 may receive a new transport layer command 625 of FIG. 6 from tunnel agent 705-2 of FIG. 7 used to invoke micro-service 340-1 of FIG. 3 to execute RPC 405 of FIG. 4, which tunnel agent 705-2 of FIG. 7 received as message 725 of FIG. 7 over PCIe tunnel 320 of FIG. 3. Then, at block 1640, RPC server 345-1 of FIG. 3 may make another new transport layer command 625 of FIG. 6 to return result 410 of FIG. 4 to tunnel agent 705-2 of FIG. 7 for wrapping in message 725 of FIG. 7 to be sent over PCIe tunnel 320 of FIG. 3.

Figure 17:
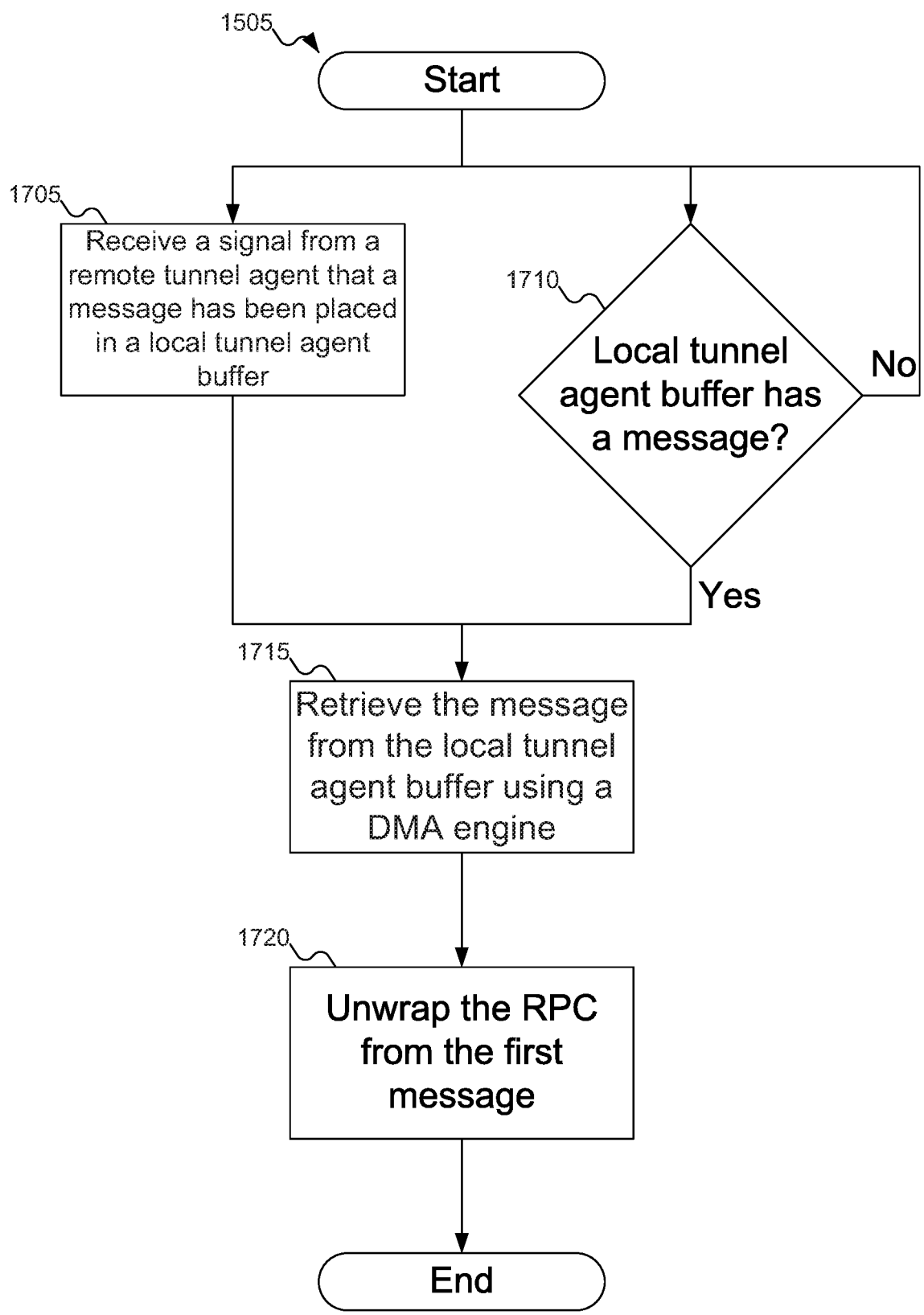
FIG. 17 shows a flowchart of an example procedure for the NVMe SSD tunnel agent of FIG. 7 to receive a message from the host tunnel agent of FIG. 7.

FIG. 17 shows a flowchart of an example procedure for tunnel agent 705-2 of FIG. 7 to receive message 725 of FIG. 7 from tunnel agent 705-1 of FIG. 7. In FIG. 17, at block 1705, receiver 835 of FIG. 8 may receive a signal from tunnel agent 705-1 of FIG. 7 that message 725 of FIG. 7 has been written to tunnel agent buffer 710-2 of FIG. 7. Alternatively, at block 1710, tunnel agent 705-2 of FIG. 7 may poll tunnel agent buffer 710-2 of FIG. 7 until tunnel agent buffer 710-2 of FIG. 7 has a message to process. Either way, at block 1715, message receiver 825 of FIG. 8 may read message 725 of FIG. 7 from tunnel agent buffer 710-2 of FIG. 7, and at block 1720 message unwrapper 830 of FIG. 8 may unwrap RPC 405 of FIG. 4 from message 725 of FIG. 7, after which tunnel agent 705-2 may send RPC 405 of FIG. 4 to the analog of RPC capture module 505 within the software stack in NVMe SSD 225 of FIG. 2.

Figure 18:
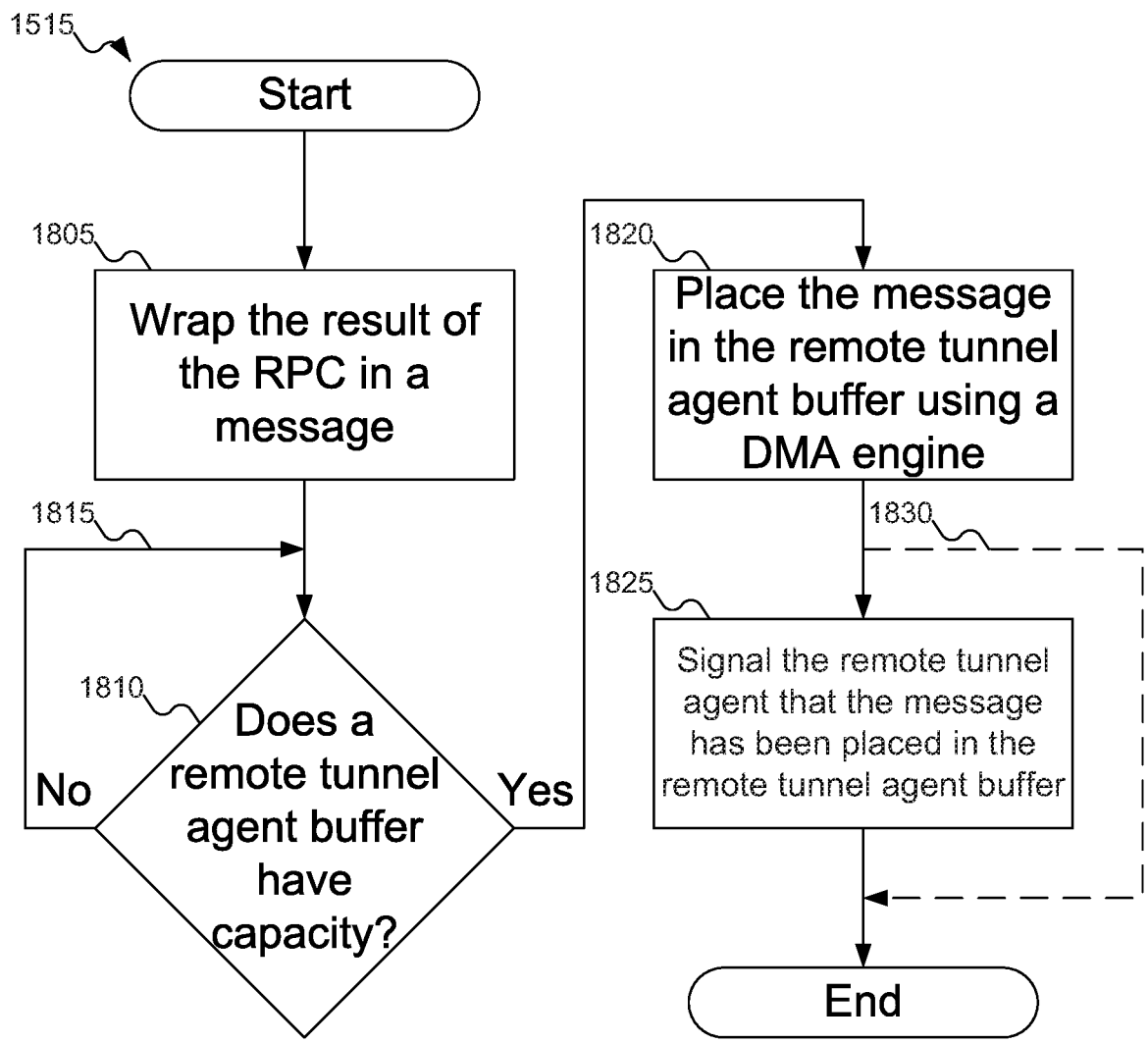
FIG. 18 shows a flowchart of an example procedure for the NVMe SSD tunnel agent of FIG. 7 to send a message to the host tunnel agent of FIG. 7.

FIG. 18 shows a flowchart of an example procedure for tunnel agent 705-2 of FIG. 7 to send message 725 of FIG. 7 to tunnel agent 705-1 of FIG. 7. Prior to FIG. 18, at some point tunnel agent 705-1 of FIG. 7 has received result 410 of FIG. 4 from the analog to RPC capture module 505 of FIG. 5 in the software stack of NVMe SSD 225 of FIG. 2. In FIG. 18, at block 1805, message wrapper 805 of FIG. 8 may wrap result 410 of FIG. 4 in message 725 of FIG. 7. At block 1810, capacity check 815 of FIG. 8 may check to verify that tunnel agent buffer 710-1 of FIG. 7 has capacity for message 725 of FIG. 7. If not, then tunnel agent 705-2 of FIG. 7 may hold message 725 of FIG. 7 until capacity check 815 of FIG. 8 determines that tunnel agent buffer 710-1 of FIG. 7 has capacity for message 725 of FIG. 7, as shown by arrow 1815. Note that holding message 725 of FIG. 7 does not imply that tunnel agent 705-2 of FIG. 7 blocks: tunnel agent 705-2 of FIG. 7 may perform other operations while waiting for tunnel agent buffer 710-1 of FIG. 7 to have capacity for message 725 of FIG. 7. For example, tunnel agent 705-2 of FIG. 7 may process messages read from tunnel agent buffer 710-2 of FIG. 7.

Once capacity check 815 of FIG. 8 determines that tunnel agent buffer 710-1 of FIG. 7 has capacity for message 725 of FIG. 7, then at block 1820 message sender 810 of FIG. 8 writes message 725 of FIG. 7 to tunnel agent buffer 710-1 of FIG. 7, and at block 1825 signaler 820 of FIG. 8 may single tunnel agent 705-1 of FIG. 7 that message 725 of FIG. 7 has been written to tunnel agent buffer 705-1 of FIG. 7. Block 1825 may be omitted, as shown by dashed line 1830. In FIGS. 11-18, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. By offloading RPCs to NVMe SSD 225 of FIG. 2, the processing load on host processor 205 of FIG. 2 is reduced, permitting host processor 205 of FIG. 2 to execute other commands. Further, by using RPC capture module 505 of FIG. 5, it may be possible to offload RPC processing to NVMe SSD 225 of FIG. 2 with relatively minimal changes to the software stack in server 105-1 of FIG. 1 and without needing to modify applications 305-1 and 305-2 of FIG. 3. Thus, existing applications may benefit from executing RPC 405 of FIG. 4 on NVMe SSD 225 of FIG. 2 without knowing that NVMe SSD 225 of FIG. 2 is executing RPC 405 of FIG. 4.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a host, comprising:

a host processor;

a memory;

an operating system running on the host processor;

an application running under the operating system on the host processor, the application including a remote procedure call (RPC);

a Peripheral Component Interconnect Express (PCIe) tunnel to a Non-Volatile Memory Express (NVMe) Solid State Drive (SSD); and an RPC capture module in the operating system to capture the RPC from the application and deliver a result of the RPC to the application as though from the host processor, wherein the NVMe SSD may execute the RPC to generate the result.

Statement 2. An embodiment of the inventive concept includes the host according to statement 1, wherein the RPC capture module includes a Man in the Middle (MitM) shim.

Statement 3. An embodiment of the inventive concept includes the host according to statement 1, wherein the RPC capture module includes a first system call to capture the RPC from the application and a second system call to receive the result of the RPC from the NVMe SSD over the PCIe tunnel.

Statement 4. An embodiment of the inventive concept includes the host according to statement 3, wherein the first system call includes a substitute system call or a wrapped system call.

Statement 5. An embodiment of the inventive concept includes the host according to statement 3, wherein the second system call includes a substitute system call or a wrapped system call.

Statement 6. An embodiment of the inventive concept includes the host according to statement 1, wherein the RPC capture module includes an Ethernet frame inspector to inspect an Ethernet frame to determine that the Ethernet frame includes the RPC.

Statement 7. An embodiment of the inventive concept includes the host according to statement 1, wherein the RPC capture module includes a first new transport layer command to receive the RPC and a second new transport layer command to receive the result of the RPC.

Statement 8. An embodiment of the inventive concept includes the host according to statement 1, further comprising a local tunnel agent to receive the RPC from the RPC capture module, the local tunnel agent including:

a message wrapper to wrap the RPC in a message; and a message sender to place the message in a remote tunnel agent buffer.

Statement 9. An embodiment of the inventive concept includes the host according to statement 8, wherein the memory includes the remote tunnel agent buffer.

Statement 10. An embodiment of the inventive concept includes the host according to statement 8, wherein the NVMe SSD includes the remote tunnel agent buffer.

Statement 11. An embodiment of the inventive concept includes the host according to statement 8, wherein the local tunnel agent is operative to use a Direct Memory Access (DMA) engine local to the host processor.

Statement 12. An embodiment of the inventive concept includes the host according to statement 8, wherein the local tunnel agent is operative to use a DMA engine local to the NVMe SSD.

Statement 13. An embodiment of the inventive concept includes the host according to statement 8, wherein the local tunnel agent is operative to place an address of the message in the remote tunnel agent buffer.

Statement 14. An embodiment of the inventive concept includes the host according to statement 8, wherein the local tunnel agent further includes a remote tunnel agent buffer capacity check to determine that the remote tunnel agent buffer has capacity for the message.

Statement 15. An embodiment of the inventive concept includes the host according to statement 8, wherein the local tunnel agent further includes a signaler to signal the NVMe SSD that the message has been placed in the remote tunnel agent buffer.

Statement 16. An embodiment of the inventive concept includes the host according to statement 1, further comprising a local tunnel agent to deliver the result of the RPC to the RPC capture module, including:

a message receiver to read a message from a local tunnel agent buffer, the message including the result of the RPC; and a message unwrapper to unwrap the result of the RPC from the message.

Statement 17. An embodiment of the inventive concept includes the host according to statement 16, the local tunnel agent further including a receiver to receive a signal from the NVMe SSD that the message has been placed in the local tunnel agent buffer.

Statement 18. An embodiment of the inventive concept includes the host according to statement 16, wherein the local tunnel agent buffer is local to the host processor.

Statement 19. An embodiment of the inventive concept includes the host according to statement 16, wherein the local tunnel agent buffer is local to the NVMe SSD.

Statement 20. An embodiment of the inventive concept includes the host according to statement 16, wherein the local tunnel agent is operative to use a DMA engine local to the host processor.

Statement 21. An embodiment of the inventive concept includes the host according to statement 16, wherein the local tunnel agent is operative to use a DMA engine local to the NVMe SSD.

Statement 22. An embodiment of the inventive concept includes the host according to statement 16, wherein the message receiver is operative to read an address of the message from a local tunnel agent buffer; and the message receiver is operative to retrieve the message using the address of the message.

Statement 23. An embodiment of the inventive concept includes the host according to statement 1, further comprising the NVMe SSD, the NVMe SSD including:

an interface to the host;

storage for data;

a message receiver to receive a first message from the host via the PCIe tunnel across the interface, the first message including the RPC;

a message unwrapper to unwrap the RPC from the first message;

an in-storage processor to execute the RPC, producing the result of the RPC;

a message wrapper to wrap the result of the RPC in a second message; and a message sender to transmit the second message to the host via the PCIe tunnel across the interface.

Statement 24. An embodiment of the inventive concept includes the host according to statement 23, the NVMe SSD further including a Man in the Middle (MitM) shim, the MitM shim including the message unwrapper and the message wrapper.

Statement 25. An embodiment of the inventive concept includes the host according to statement 23, wherein:

the message unwrapper is operative to call the RPC using a first system call; and the message wrapper is operative to receive the result of the RPC from a second system call.

Statement 26. An embodiment of the inventive concept includes the host according to statement 25, wherein the first system call includes a substitute system call or a wrapped system call.

Statement 27. An embodiment of the inventive concept includes the host according to statement 25, wherein the second system call includes a substitute system call or a wrapped system call.

Statement 28. An embodiment of the inventive concept includes the host according to statement 23, wherein:

the message unwrapper is operative to unwrap an Ethernet frame including the RPC in the first message; and the message wrapper is operative to wrap an Ethernet frame including the result of the RPC in the second message.

Statement 29. An embodiment of the inventive concept includes the host according to statement 23, wherein:

the message unwrapper is operative to unwrap a first new transport layer command including the RPC in the first message; and the message wrapper is operative to wrap a second new transport layer command including the result of the RPC in the second message.

Statement 30. An embodiment of the inventive concept includes the host according to statement 23, the NVMe SSD including a local tunnel agent to read the first message from a local tunnel agent buffer and to write the second message to a remote tunnel agent buffer.

Statement 31. An embodiment of the inventive concept includes the host according to statement 30, wherein the local tunnel agent buffer is local to the host processor.

Statement 32. An embodiment of the inventive concept includes the host according to statement 30, wherein the local tunnel agent buffer is local to the NVMe SSD.

Statement 33. An embodiment of the inventive concept includes the host according to statement 30, wherein the remote tunnel agent buffer is local to the host processor.

Statement 34. An embodiment of the inventive concept includes the host according to statement 30, wherein the remote tunnel agent buffer is local to the NVMe SSD.

Statement 35. An embodiment of the inventive concept includes the host according to statement 30, wherein the local tunnel agent is operative to use a DMA engine to read the first message from the local tunnel agent buffer and to write the second message to the remote tunnel agent buffer.

Statement 36. An embodiment of the inventive concept includes the host according to statement 35, wherein the DMA engine is local to the host processor.

Statement 37. An embodiment of the inventive concept includes the host according to statement 35, wherein the DMA engine is local to the NVMe SSD.

Statement 38. An embodiment of the inventive concept includes the host according to statement 30, wherein the local tunnel agent is operative to read an address of the first message from the local tunnel agent buffer and to read the first message using the address of the first message.

Statement 39. An embodiment of the inventive concept includes the host according to statement 30, wherein the local tunnel agent is operative to write the second message to an address of the second message and to write the address of the second message to the remote tunnel agent buffer.

Statement 40. An embodiment of the inventive concept includes the host according to statement 30, wherein the local tunnel agent is operative to read the first message from the local tunnel agent buffer based at least in part on the local tunnel agent buffer having the first message.

Statement 41. An embodiment of the inventive concept includes the host according to statement 30, wherein the local tunnel agent further includes a remote tunnel agent buffer capacity check to determine that the remote tunnel agent buffer has capacity for the second message.

Statement 42. An embodiment of the inventive concept includes a Non-Volatile Memory Express (NVMe) Solid State Drive (SSD), comprising:

an interface to a host;

storage for data;

a message receiver to receive a first message from the host via a Peripheral Component Interconnect Express (PCIe) tunnel across the interface, the first message including a remote procedure call (RPC);

a message unwrapper to unwrap the RPC from the first message;

an in-storage processor to execute the RPC, producing a result of the RPC;

a message wrapper to wrap the result of the RPC in a second message; and a message sender to transmit the second message to the host via the PCIe tunnel across the interface.

Statement 43. An embodiment of the inventive concept includes the NVMe SSD according to statement 42, further comprising a Man in the Middle (MitM) shim, the MitM shim including the message unwrapper and the message wrapper.

Statement 44. An embodiment of the inventive concept includes the NVMe SSD according to statement 42, wherein:

the message unwrapper is operative to call the RPC using a first system call; and the message wrapper is operative to receive the result of the RPC from a second system call.

Statement 45. An embodiment of the inventive concept includes the NVMe SSD according to statement 44, wherein the first system call includes a substitute system call or a wrapped system call.

Statement 46. An embodiment of the inventive concept includes the NVMe SSD according to statement 44, wherein the second system call includes a substitute system call or a wrapped system call.

Statement 47. An embodiment of the inventive concept includes the NVMe SSD according to statement 42, wherein:

the message unwrapper is operative to unwrap an Ethernet frame including the RPC in the first message; and the message wrapper is operative to wrap an Ethernet frame including the result of the RPC in the second message.

Statement 48. An embodiment of the inventive concept includes the NVMe SSD according to statement 42, wherein:

the message unwrapper is operative to unwrap a first new transport layer command including the RPC in the first message; and the message wrapper is operative to wrap a second new transport layer command including the result of the RPC in the second message.

Statement 49. An embodiment of the inventive concept includes the NVMe SSD according to statement 42, further comprising a local tunnel agent to read the first message from a local tunnel agent buffer and to write the second message to a remote tunnel agent buffer.

Statement 50. An embodiment of the inventive concept includes the NVMe SSD according to statement 49, wherein the local tunnel agent buffer is local to a host processor.

Statement 51. An embodiment of the inventive concept includes the NVMe SSD according to statement 49, wherein the local tunnel agent buffer is local to the NVMe SSD.

Statement 52. An embodiment of the inventive concept includes the NVMe SSD according to statement 49, wherein the remote tunnel agent buffer is local to a host processor.

Statement 53. An embodiment of the inventive concept includes the NVMe SSD according to statement 49, wherein the remote tunnel agent buffer is local to the NVMe SSD.

Statement 54. An embodiment of the inventive concept includes the NVMe SSD according to statement 49, wherein the local tunnel agent is operative to use a Direct Memory Access (DMA) engine to read the first message from the local tunnel agent buffer and to write the second message to the remote tunnel agent buffer.

Statement 55. An embodiment of the inventive concept includes the NVMe SSD according to statement 54, wherein the DMA engine is local to a host processor.

Statement 56. An embodiment of the inventive concept includes the NVMe SSD according to statement 54, wherein the DMA engine is local to the NVMe SSD.

Statement 57. An embodiment of the inventive concept includes the NVMe SSD according to statement 49, wherein the local tunnel agent is operative to read an address of the first message from the local tunnel agent buffer and to read the first message using the address of the first message.

Statement 58. An embodiment of the inventive concept includes the NVMe SSD according to statement 49, wherein the local tunnel agent is operative to write the second message to an address of the second message and to write the address of the second message to the remote tunnel agent buffer.

Statement 59. An embodiment of the inventive concept includes the NVMe SSD according to statement 49, wherein the local tunnel agent is operative to read the first message from the local tunnel agent buffer based at least in part on the local tunnel agent buffer having the first message.

Statement 60. An embodiment of the inventive concept includes the NVMe SSD according to statement 49, wherein the local tunnel agent further includes a remote tunnel agent buffer capacity check to determine that the remote tunnel agent buffer has capacity for the second message.

Statement 61. An embodiment of the inventive concept includes a method, comprising:
intercepting a remote procedure call (RPC) from an application to a host processor;
delivering the RPC to a Non-Volatile Memory Express (NVMe) Solid State Drive (SSD) over a Peripheral Component Interconnect Express (PCIe) tunnel;
receiving a result of the RPC from the NVMe SSD over the PCIe tunnel; and
delivering the result of the RPC to the application as though from the host processor.

Statement 62. An embodiment of the inventive concept includes the method according to statement 61, wherein:
intercepting an RPC from an application to a host processor includes capturing the RPC sent by a RPC client using a Man in the Middle (MitM) shim; and
receiving a result of the RPC from the NVMe SSD over the PCIe tunnel includes receiving the result of the RPC from the NVMe SSD over the PCIe tunnel at the MitM shim.

Statement 63. An embodiment of the inventive concept includes the method according to statement 61, wherein:
intercepting an RPC from an application to a host processor includes capturing the RPC from the application using a first system call; and
receiving a result of the RPC from the NVMe SSD over the PCIe tunnel includes receiving the result of the RPC from the NVMe SSD using a second system call.

Statement 64. An embodiment of the inventive concept includes the method according to statement 63, wherein the first system call includes a substitute system call or a wrapped system call.

Statement 65. An embodiment of the inventive concept includes the method according to statement 63, wherein the second system call includes a substitute system call or a wrapped system call.

Statement 66. An embodiment of the inventive concept includes the method according to statement 61, wherein:
intercepting an RPC from an application to a host processor includes:
inspecting an Ethernet frame to determine that the Ethernet frame includes the RPC; and
based at least in part on the Ethernet frame including the RPC, capturing the Ethernet frame; and
receiving a result of the RPC from the NVMe SSD over the PCIe tunnel includes receiving the result of the RPC from the NVMe SSD in a second Ethernet frame.

Statement 67. An embodiment of the inventive concept includes the method according to statement 61, wherein:
intercepting an RPC from an application to a host processor includes capturing the RPC from the application using a first new transport layer command; and
receiving a result of the RPC from the NVMe SSD over the PCIe tunnel includes receiving the result of the RPC from the NVMe SSD over the PCIe tunnel using a second new transport layer command.

Statement 68. An embodiment of the inventive concept includes the method according to statement 61, wherein delivering the RPC to an NVMe SSD over a PCIe tunnel includes:
wrapping the RPC in a message by a local tunnel agent; and
placing the message in a remote tunnel agent buffer by the local tunnel agent.

Statement 69. An embodiment of the inventive concept includes the method according to statement 68, wherein the remote tunnel agent buffer is local to the host processor.

Statement 70. An embodiment of the inventive concept includes the method according to statement 68, wherein the remote tunnel agent buffer is local to the NVMe SSD.

Statement 71. An embodiment of the inventive concept includes the method according to statement 68, wherein placing the message in a remote tunnel agent buffer by the local tunnel agent includes using a Direct Memory Access (DMA) engine local to the host processor.

Statement 72. An embodiment of the inventive concept includes the method according to statement 68, wherein placing the message in a remote tunnel agent buffer by the local tunnel agent includes using a DMA engine local to the NVMe SSD.

Statement 73. An embodiment of the inventive concept includes the method according to statement 68, wherein placing the message in a remote tunnel agent buffer by the local tunnel agent includes:
writing the message at an address of the message; and
placing the address of the message in the remote tunnel agent buffer by the local tunnel agent.

Statement 74. An embodiment of the inventive concept includes the method according to statement 68, wherein placing the message in a remote tunnel agent buffer by the local tunnel agent includes, based at least in part on the remote tunnel agent buffer having capacity for the message, placing the message in the remote tunnel agent buffer by the local tunnel agent.

Statement 75. An embodiment of the inventive concept includes the method according to statement 68, wherein delivering the RPC to an NVMe SSD over a PCIe tunnel further includes signaling the remote tunnel agent that the message has been placed in the remote tunnel agent buffer.

Statement 76. An embodiment of the inventive concept includes the method according to statement 61, wherein receiving a result of the RPC from the NVMe SSD over the PCIe tunnel includes:

retrieving a message from a local tunnel agent buffer by a local tunnel agent; and unwrapping the result of the RPC from the message by the local tunnel agent.

Statement 77. An embodiment of the inventive concept includes the method according to statement 76, wherein the local tunnel agent buffer is local to the host processor.

Statement 78. An embodiment of the inventive concept includes the method according to statement 76, wherein the local tunnel agent buffer is local to the NVMe SSD.

Statement 79. An embodiment of the inventive concept includes the method according to statement 76, wherein receiving a result of the RPC from the NVMe SSD over the PCIe tunnel further includes receiving a signal from the remote tunnel agent that the message has been placed in the local tunnel agent buffer.

Statement 80. An embodiment of the inventive concept includes the method according to statement 76, wherein retrieving a message from a local tunnel agent buffer by a local tunnel agent includes, based at least in part on the local tunnel agent buffer having the message, retrieving the message from a local tunnel agent buffer by a local tunnel agent.

Statement 81. An embodiment of the inventive concept includes the method according to statement 76, wherein retrieving a message from a local tunnel agent buffer by a local tunnel agent includes using a DMA engine local to the host processor.

Statement 82. An embodiment of the inventive concept includes the method according to statement 76, wherein retrieving a message from a local tunnel agent buffer by a local tunnel agent includes using a DMA engine local to the NVMe SSD.

Statement 83. An embodiment of the inventive concept includes the method according to statement 76, wherein retrieving a message from a local tunnel agent buffer by a local tunnel agent includes:

retrieving an address of the message in the remote tunnel agent buffer by the local tunnel agent; and retrieving the message using the address of the message.

Statement 84. An embodiment of the inventive concept includes the method according to statement 61, further comprising:

receiving, at the NVMe SSD, a first message including the RPC over the PCIe tunnel;

unwrapping the RPC from the first message;

executing the RPC on an in-storage processor on the NVMe SSD, producing the result of the RPC;

wrapping the result of the RPC in a second message; and sending the second message from the NVMe SSD over the PCIe tunnel.

Statement 85. An embodiment of the inventive concept includes the method according to statement 84, wherein:

receiving, at the NVMe SSD, a first message including the RPC over the PCIe tunnel includes receiving the first message at a Man in the Middle (MitM) shim; and sending the second message from the NVMe SSD over the PCIe tunnel includes sending the second message from the NVMe SSD over the PCIe tunnel using the MitM shim.

Statement 86. An embodiment of the inventive concept includes the method according to statement 84, wherein:

receiving, at the NVMe SSD, a first message including the RPC over the PCIe tunnel includes receiving the first message using a first system call; and sending the second message from the NVMe SSD over the PCIe tunnel includes sending the second message from the NVMe SSD over the PCIe tunnel using a second system call.

Statement 87. An embodiment of the inventive concept includes the method according to statement 86, wherein the first system call includes a substitute system call or a wrapped system call.

Statement 88. An embodiment of the inventive concept includes the method according to statement 86, wherein the second system call includes a substitute system call or a wrapped system call.

Statement 89. An embodiment of the inventive concept includes the method according to statement 84, wherein:

receiving, at the NVMe SSD, a first message including the RPC over the PCIe tunnel includes receiving a first Ethernet frame including the RPC; and sending the second message from the NVMe SSD over the PCIe tunnel includes sending a second Ethernet frame including the result of the RPC from the NVMe SSD over the PCIe tunnel.

Statement 90. An embodiment of the inventive concept includes the method according to statement 84, wherein:

receiving, at the NVMe SSD, a first message including the RPC over the PCIe tunnel includes receiving the first message using a first new transport layer command; and sending the second message from the NVMe SSD over the PCIe tunnel includes sending the second message from the NVMe SSD over the PCIe tunnel using a second new transport layer command.

Statement 91. An embodiment of the inventive concept includes the method according to statement 84, wherein receiving, at the NVMe SSD, a first message including the RPC over the PCIe tunnel includes reading the first message from a local tunnel agent buffer by a local tunnel agent.

Statement 92. An embodiment of the inventive concept includes the method according to statement 91, wherein the local tunnel agent buffer is local to the host processor.

Statement 93. An embodiment of the inventive concept includes the method according to statement 91, wherein the local tunnel agent buffer is local to the NVMe SSD.

Statement 94. An embodiment of the inventive concept includes the method according to statement 91, wherein reading the first message from a local tunnel agent buffer by a local tunnel agent includes using a DMA engine local to the host processor.

Statement 95. An embodiment of the inventive concept includes the method according to statement 91, wherein reading the first message from a local tunnel agent buffer by a local tunnel agent includes using a DMA engine local to the NVMe SSD.

Statement 96. An embodiment of the inventive concept includes the method according to statement 91, wherein reading the first message from a local tunnel agent buffer by a local tunnel agent includes:

reading an address of the first message from the local tunnel agent buffer by the local tunnel agent; and reading the first message using the address of the first message.

Statement 97. An embodiment of the inventive concept includes the method according to statement 91, wherein reading the first message from a local tunnel agent buffer by a local tunnel agent includes, based at least in part on the local tunnel agent buffer having the first message, reading the first message from a local tunnel agent buffer by a local tunnel agent.

Statement 98. An embodiment of the inventive concept includes the method according to statement 91, wherein receiving, at the NVMe SSD, a first message including the RPC over the PCIe tunnel further includes receiving a signal from a remote tunnel agent that the first message has been placed in the local tunnel agent buffer.

Statement 99. An embodiment of the inventive concept includes the method according to statement 84, wherein sending the second message from the NVMe SSD over the PCIe tunnel includes placing the second message in a remote tunnel agent buffer by a local tunnel agent.

Statement 100. An embodiment of the inventive concept includes the method according to statement 99, wherein placing the second message in a remote tunnel agent buffer by a local tunnel agent includes, based at least in part on the remote tunnel agent buffer having capacity for the second message, placing the second message in a remote tunnel agent buffer by a local tunnel agent.

Statement 101. An embodiment of the inventive concept includes the method according to statement 99, wherein the remote tunnel agent buffer is local to the host processor.

Statement 102. An embodiment of the inventive concept includes the method according to statement 99, wherein the remote tunnel agent buffer is local to the NVMe SSD.

Statement 103. An embodiment of the inventive concept includes the method according to statement 99, wherein placing the second message in a remote tunnel agent buffer by a local tunnel agent includes using a DMA engine local to the host processor.

Statement 104. An embodiment of the inventive concept includes the method according to statement 99, wherein placing the second message in a remote tunnel agent buffer by a local tunnel agent includes using a DMA engine local to the NVMe SSD.

Statement 105. An embodiment of the inventive concept includes the method according to statement 99, wherein placing the second message in a remote tunnel agent buffer by the local tunnel agent includes placing an address of the second message in the remote tunnel agent buffer by the local tunnel agent.

Statement 106. An embodiment of the inventive concept includes a method, comprising:
  receiving, at a Non-Volatile Memory Express (NVMe) Solid State Drive (SSD), a first message including a remote procedure call (RPC) over a Peripheral Component Interconnect Express (PCIe) tunnel;
  unwrapping the RPC from the first message;
  executing the RPC on an in-storage processor on the NVMe SSD, producing a result of the RPC;
  wrapping the result of the procedure call in a second message; and
  sending the second message from the NVMe SSD over the PCIe tunnel.

Statement 107. An embodiment of the inventive concept includes the method according to statement 106, wherein:
  receiving, at an NVMe SSD, a first message including a RPC over a PCIe tunnel includes receiving the first message at a Man in the Middle (MitM) shim; and
  sending the second message from the NVMe SSD over the PCIe tunnel includes sending the second message from the NVMe SSD over the PCIe tunnel using the MitM shim.

Statement 108. An embodiment of the inventive concept includes the method according to statement 106, wherein:
  receiving, at an NVMe SSD, a first message including a RPC over a PCIe tunnel includes receiving the first message using a first system call; and
  sending the second message from the NVMe SSD over the PCIe tunnel includes sending the second message from the NVMe SSD over the PCIe tunnel using a second system call.

Statement 109. An embodiment of the inventive concept includes the method according to statement 108, wherein the first system call includes a substitute system call or a wrapped system call.

Statement 110. An embodiment of the inventive concept includes the method according to statement 108, wherein the second system call includes a substitute system call or a wrapped system call.

Statement 111. An embodiment of the inventive concept includes the method according to statement 106, wherein:
  receiving, at an NVMe SSD, a first message including a RPC over a PCIe tunnel includes receiving a first Ethernet frame including the RPC; and
  sending the second message from the NVMe SSD over the PCIe tunnel includes sending a second Ethernet frame including the result of the procedure call from the NVMe SSD over the PCIe tunnel.

Statement 112. An embodiment of the inventive concept includes the method according to statement 106, wherein:
  receiving, at an NVMe SSD, a first message including a RPC over a PCIe tunnel includes receiving the first message using a first new transport layer command; and
  sending the second message from the NVMe SSD over the PCIe tunnel includes sending the second message from the NVMe SSD over the PCIe tunnel using a second new transport layer command.

Statement 113. An embodiment of the inventive concept includes the method according to statement 106, wherein receiving, at an NVMe SSD, a first message including a RPC over a PCIe tunnel includes reading the first message from a local tunnel agent buffer by a local tunnel agent.

Statement 114. An embodiment of the inventive concept includes the method according to statement 113, wherein the local tunnel agent buffer is local to a host processor.

Statement 115. An embodiment of the inventive concept includes the method according to statement 113, wherein the local tunnel agent buffer is local to the NVMe SSD.

Statement 116. An embodiment of the inventive concept includes the method according to statement 113, wherein reading the first message from a local tunnel agent buffer by a local tunnel agent includes using a Direct Memory Access (DMA) engine local to a host processor.

Statement 117. An embodiment of the inventive concept includes the method according to statement 113, wherein reading the first message from a local tunnel agent buffer by a local tunnel agent includes using a DMA engine local to the NVMe SSD.

Statement 118. An embodiment of the inventive concept includes the method according to statement 113, wherein reading the first message from a local tunnel agent buffer by a local tunnel agent includes:
  reading an address of the first message from the local tunnel agent buffer by the local tunnel agent; and
  reading the first message using the address of the first message.

Statement 119. An embodiment of the inventive concept includes the method according to statement 113, wherein reading the first message from a local tunnel agent buffer by a local tunnel agent includes, based at least in part on the local tunnel agent buffer having the first message, reading the first message from a local tunnel agent buffer by a local tunnel agent.

Statement 120. An embodiment of the inventive concept includes the method according to statement 113, wherein receiving, at an NVMe SSD, a first message including a RPC over a PCIe tunnel further includes receiving a signal from a remote tunnel agent that the first message has been placed in the local tunnel agent buffer.

Statement 121. An embodiment of the inventive concept includes the method according to statement 106, wherein sending the second message from the NVMe SSD over the PCIe tunnel includes placing the second message in a remote tunnel agent buffer by a local tunnel agent.

Statement 122. An embodiment of the inventive concept includes the method according to statement 121, wherein placing the second message in a remote tunnel agent buffer by a local tunnel agent includes, based at least in part on the remote tunnel agent buffer having capacity for the second message, placing the second message in a remote tunnel agent buffer by a local tunnel agent.

Statement 123. An embodiment of the inventive concept includes the method according to statement 121, wherein the remote tunnel agent buffer is local to a host processor.

Statement 124. An embodiment of the inventive concept includes the method according to statement 121, wherein the remote tunnel agent buffer is local to the NVMe SSD.

Statement 125. An embodiment of the inventive concept includes the method according to statement 121, wherein placing the second message in a remote tunnel agent buffer by a local tunnel agent includes using a DMA engine local to a host processor.

Statement 126. An embodiment of the inventive concept includes the method according to statement 121, wherein placing the second message in a remote tunnel agent buffer by a local tunnel agent using a DMA engine local to the NVMe SSD.

Statement 127. An embodiment of the inventive concept includes the method according to statement 121, wherein placing the second message in a remote tunnel agent buffer by the local tunnel agent includes placing an address of the second message in the remote tunnel agent buffer by the local tunnel agent.

Statement 128. An embodiment of the inventive concept includes an article, comprising a tangible, non-transitory storage medium, the tangible, non-transitory storage medium having stored thereon instructions that, when executed by a machine, result in:
intercepting a remote procedure call (RPC) from an application to a host processor;
delivering the RPC to a Non-Volatile Memory Express (NVMe) Solid State Drive (SSD) over a Peripheral Component Interconnect Express (PCIe) tunnel;
receiving a result of the RPC from the NVMe SSD over the PCIe tunnel; and
delivering the result of the RPC to the application as though from the host processor.

Statement 129. An embodiment of the inventive concept includes the article according to statement 128, wherein:
intercepting an RPC from an application to a host processor includes capturing the RPC sent by a RPC client using a Man in the Middle (MitM) shim; and
receiving a result of the RPC from the NVMe SSD over the PCIe tunnel includes receiving the result of the RPC from the NVMe SSD over the PCIe tunnel at the MitM shim.

Statement 130. An embodiment of the inventive concept includes the article according to statement 128, wherein:
intercepting an RPC from an application to a host processor includes capturing the RPC from the application using a first system call; and
receiving a result of the RPC from the NVMe SSD over the PCIe tunnel includes receiving the result of the RPC from the NVMe SSD using a second system call.

Statement 131. An embodiment of the inventive concept includes the article according to statement 130, wherein the first system call includes a substitute system call or a wrapped system call.

Statement 132. An embodiment of the inventive concept includes the article according to statement 130, wherein the second system call includes a substitute system call or a wrapped system call.

Statement 133. An embodiment of the inventive concept includes the article according to statement 128, wherein:
intercepting an RPC from an application to a host processor includes:
inspecting an Ethernet frame to determine that the Ethernet frame includes the RPC; and
based at least in part on the Ethernet frame including the RPC, capturing the Ethernet frame; and
receiving a result of the RPC from the NVMe SSD over the PCIe tunnel includes receiving the result of the RPC from the NVMe SSD in a second Ethernet frame.

Statement 134. An embodiment of the inventive concept includes the article according to statement 128, wherein:
intercepting an RPC from an application to a host processor includes capturing the RPC from the application using a first new transport layer command; and
receiving a result of the RPC from the NVMe SSD over the PCIe tunnel includes receiving the result of the RPC from the NVMe SSD over the PCIe tunnel using a second new transport layer command.

Statement 135. An embodiment of the inventive concept includes the article according to statement 128, wherein delivering the RPC to an NVMe SSD over a PCIe tunnel includes:
wrapping the RPC in a message by a local tunnel agent; and
placing the message in a remote tunnel agent buffer by the local tunnel agent.

Statement 136. An embodiment of the inventive concept includes the article according to statement 135, wherein the remote tunnel agent buffer is local to the host processor.

Statement 137. An embodiment of the inventive concept includes the article according to statement 135, wherein the remote tunnel agent buffer is local to the NVMe SSD.

Statement 138. An embodiment of the inventive concept includes the article according to statement 135, wherein placing the message in a remote tunnel agent buffer by the local tunnel agent includes using a Direct Memory Access (DMA) engine local to the host processor.

Statement 139. An embodiment of the inventive concept includes the article according to statement 135, wherein placing the message in a remote tunnel agent buffer by the local tunnel agent includes using a DMA engine local to the NVMe SSD.

Statement 140. An embodiment of the inventive concept includes the article according to statement 135, wherein placing the message in a remote tunnel agent buffer by the local tunnel agent includes:
writing the message at an address of the message; and
placing the address of the message in the remote tunnel agent buffer by the local tunnel agent.

Statement 141. An embodiment of the inventive concept includes the article according to statement 135, wherein placing the message in a remote tunnel agent buffer by the local tunnel agent includes, based at least in part on the remote tunnel agent buffer having capacity for the message, placing the message in the remote tunnel agent buffer by the local tunnel agent.

Statement 142. An embodiment of the inventive concept includes the article according to statement 135, wherein delivering the RPC to an NVMe SSD over a PCIe tunnel further includes signaling the remote tunnel agent that the message has been placed in the remote tunnel agent buffer.

Statement 143. An embodiment of the inventive concept includes the article according to statement 128, wherein receiving a result of the RPC from the NVMe SSD over the PCIe tunnel includes:

retrieving a message from a local tunnel agent buffer by a local tunnel agent; and unwrapping the result of the RPC from the message by the local tunnel agent.

Statement 144. An embodiment of the inventive concept includes the article according to statement 143, wherein the local tunnel agent buffer is local to the host processor.

Statement 145. An embodiment of the inventive concept includes the article according to statement 143, wherein the local tunnel agent buffer is local to the NVMe SSD.

Statement 146. An embodiment of the inventive concept includes the article according to statement 143, wherein receiving a result of the RPC from the NVMe SSD over the PCIe tunnel further includes receiving a signal from the remote tunnel agent that the message has been placed in the local tunnel agent buffer.

Statement 147. An embodiment of the inventive concept includes the article according to statement 143, wherein retrieving a message from a local tunnel agent buffer by a local tunnel agent includes, based at least in part on the local tunnel agent buffer having the message, retrieving the message from a local tunnel agent buffer by a local tunnel agent.

Statement 148. An embodiment of the inventive concept includes the article according to statement 143, wherein retrieving a message from a local tunnel agent buffer by a local tunnel agent includes using a DMA engine local to the host processor.

Statement 149. An embodiment of the inventive concept includes the article according to statement 143, wherein retrieving a message from a local tunnel agent buffer by a local tunnel agent includes using a DMA engine local to the NVMe SSD.

Statement 150. An embodiment of the inventive concept includes the article according to statement 143, wherein retrieving a message from a local tunnel agent buffer by a local tunnel agent includes:

retrieving an address of the message in the remote tunnel agent buffer by the local tunnel agent; and retrieving the message using the address of the message.

Statement 151. An embodiment of the inventive concept includes the article according to statement 128, the tangible, non-transitory storage medium, having stored thereon further instructions that, when executed by the machine, result in:

receiving, at the NVMe SSD, a first message including the RPC over the PCIe tunnel;

unwrapping the RPC from the first message;

executing the RPC on an in-storage processor on the NVMe SSD, producing the result of the RPC;

wrapping the result of the RPC in a second message; and sending the second message from the NVMe SSD over the PCIe tunnel.

Statement 152. An embodiment of the inventive concept includes the article according to statement 151, wherein:

receiving, at the NVMe SSD, a first message including the RPC over the PCIe tunnel includes receiving the first message at a Man in the Middle (MitM) shim; and sending the second message from the NVMe SSD over the PCIe tunnel includes sending the second message from the NVMe SSD over the PCIe tunnel using the MitM shim.

Statement 153. An embodiment of the inventive concept includes the article according to statement 151, wherein:

receiving, at the NVMe SSD, a first message including the RPC over the PCIe tunnel includes receiving the first message using a first system call; and sending the second message from the NVMe SSD over the PCIe tunnel includes sending the second message from the NVMe SSD over the PCIe tunnel using a second system call.

Statement 154. An embodiment of the inventive concept includes the article according to statement 153, wherein the first system call includes a substitute system call or a wrapped system call.

Statement 155. An embodiment of the inventive concept includes the article according to statement 153, wherein the second system call includes a substitute system call or a wrapped system call.

Statement 156. An embodiment of the inventive concept includes the article according to statement 151, wherein:

receiving, at the NVMe SSD, a first message including the RPC over the PCIe tunnel includes receiving a first Ethernet frame including the RPC; and sending the second message from the NVMe SSD over the PCIe tunnel includes sending a second Ethernet frame including the result of the RPC from the NVMe SSD over the PCIe tunnel.

Statement 157. An embodiment of the inventive concept includes the article according to statement 151, wherein:

receiving, at the NVMe SSD, a first message including the RPC over the PCIe tunnel includes receiving the first message using a first new transport layer command; and sending the second message from the NVMe SSD over the PCIe tunnel includes sending the second message from the NVMe SSD over the PCIe tunnel using a second new transport layer command.

Statement 158. An embodiment of the inventive concept includes the article according to statement 151, wherein receiving, at the NVMe SSD, a first message including the RPC over the PCIe tunnel includes reading the first message from a local tunnel agent buffer by a local tunnel agent.

Statement 159. An embodiment of the inventive concept includes the article according to statement 158, wherein the local tunnel agent buffer is local to the host processor.

Statement 160. An embodiment of the inventive concept includes the article according to statement 158, wherein the local tunnel agent buffer is local to the NVMe SSD.

Statement 161. An embodiment of the inventive concept includes the article according to statement 158, wherein reading the first message from a local tunnel agent buffer by a local tunnel agent includes using a DMA engine local to the host processor.

Statement 162. An embodiment of the inventive concept includes the article according to statement 158, wherein reading the first message from a local tunnel agent buffer by a local tunnel agent includes using a DMA engine local to the NVMe SSD.

Statement 163. An embodiment of the inventive concept includes the article according to statement 158, wherein reading the first message from a local tunnel agent buffer by a local tunnel agent includes:

reading an address of the first message from the local tunnel agent buffer by the local tunnel agent; and reading the first message using the address of the first message.

Statement 164. An embodiment of the inventive concept includes the article according to statement 158, wherein reading the first message from a local tunnel agent buffer by a local tunnel agent includes, based at least in part on the local tunnel agent buffer having the first message, reading the first message from a local tunnel agent buffer by a local tunnel agent.

Statement 165. An embodiment of the inventive concept includes the article according to statement 158, wherein receiving, at the NVMe SSD, a first message including the RPC over the PCIe tunnel further includes receiving a signal from a remote tunnel agent that the first message has been placed in the local tunnel agent buffer.

Statement 166. An embodiment of the inventive concept includes the article according to statement 151, wherein sending the second message from the NVMe SSD over the PCIe tunnel includes placing the second message in a remote tunnel agent buffer by a local tunnel agent.

Statement 167. An embodiment of the inventive concept includes the article according to statement 166, wherein placing the second message in a remote tunnel agent buffer by a local tunnel agent includes, based at least in part on the remote tunnel agent buffer having capacity for the second message, placing the second message in a remote tunnel agent buffer by a local tunnel agent.

Statement 168. An embodiment of the inventive concept includes the article according to statement 166, wherein the remote tunnel agent buffer is local to the host processor.

Statement 169. An embodiment of the inventive concept includes the article according to statement 166, wherein the remote tunnel agent buffer is local to the NVMe SSD.

Statement 170. An embodiment of the inventive concept includes the article according to statement 166, wherein placing the second message in a remote tunnel agent buffer by a local tunnel agent includes using a DMA engine local to the host processor.

Statement 171. An embodiment of the inventive concept includes the article according to statement 166, wherein placing the second message in a remote tunnel agent buffer by a local tunnel agent includes using a DMA engine local to the NVMe SSD.

Statement 172. An embodiment of the inventive concept includes the article according to statement 166, wherein placing the second message in a remote tunnel agent buffer by the local tunnel agent includes placing an address of the second message in the remote tunnel agent buffer by the local tunnel agent.

Statement 173. An embodiment of the inventive concept includes an article, comprising a tangible, non-transitory storage medium, the tangible, non-transitory storage medium having stored thereon instructions that, when executed by a machine, result in:

receiving, at a Non-Volatile Memory Express (NVMe) Solid State Drive (SSD), a first message including a remote procedure call (RPC) over a Peripheral Component Interconnect Express (PCIe) tunnel;

unwrapping the RPC from the first message;

executing the RPC on an in-storage processor on the NVMe SSD, producing a result of the RPC;

wrapping the result of the procedure call in a second message; and sending the second message from the NVMe SSD over the PCIe tunnel.

Statement 174. An embodiment of the inventive concept includes the article according to statement 173, wherein:

receiving, at an NVMe SSD, a first message including a RPC over a PCIe tunnel includes receiving the first message at a Man in the Middle (MitM) shim; and sending the second message from the NVMe SSD over the PCIe tunnel includes sending the second message from the NVMe SSD over the PCIe tunnel using the MitM shim.

Statement 175. An embodiment of the inventive concept includes the article according to statement 173, wherein:

receiving, at an NVMe SSD, a first message including a RPC over a PCIe tunnel includes receiving the first message using a first system call; and sending the second message from the NVMe SSD over the PCIe tunnel includes sending the second message from the NVMe SSD over the PCIe tunnel using a second system call.

Statement 176. An embodiment of the inventive concept includes the article according to statement 175, wherein the first system call includes a substitute system call or a wrapped system call.

Statement 177. An embodiment of the inventive concept includes the article according to statement 175, wherein the second system call includes a substitute system call or a wrapped system call.

Statement 178. An embodiment of the inventive concept includes the article according to statement 173, wherein:

receiving, at an NVMe SSD, a first message including a RPC over a PCIe tunnel includes receiving a first Ethernet frame including the RPC; and sending the second message from the NVMe SSD over the PCIe tunnel includes sending a second Ethernet frame including the result of the procedure call from the NVMe SSD over the PCIe tunnel.

Statement 179. An embodiment of the inventive concept includes the article according to statement 173, wherein:

receiving, at an NVMe SSD, a first message including a RPC over a PCIe tunnel includes receiving the first message using a first new transport layer command; and sending the second message from the NVMe SSD over the PCIe tunnel includes sending the second message from the NVMe SSD over the PCIe tunnel using a second new transport layer command.

Statement 180. An embodiment of the inventive concept includes the article according to statement 173, wherein receiving, at an NVMe SSD, a first message including a RPC over a PCIe tunnel includes reading the first message from a local tunnel agent buffer by a local tunnel agent.

Statement 181. An embodiment of the inventive concept includes the article according to statement 180, wherein the local tunnel agent buffer is local to a host processor.

Statement 182. An embodiment of the inventive concept includes the article according to statement 180, wherein the local tunnel agent buffer is local to the NVMe SSD.

Statement 183. An embodiment of the inventive concept includes the article according to statement 180, wherein reading the first message from a local tunnel agent buffer by a local tunnel agent includes using a Direct Memory Access (DMA) engine local to a host processor.

Statement 184. An embodiment of the inventive concept includes the article according to statement 180, wherein reading the first message from a local tunnel agent buffer by a local tunnel agent includes using a DMA engine local to the NVMe SSD.

Statement 185. An embodiment of the inventive concept includes the article according to statement 180, wherein reading the first message from a local tunnel agent buffer by a local tunnel agent includes:

reading an address of the first message from the local tunnel agent buffer by the local tunnel agent; and reading the first message using the address of the first message.

Statement 186. An embodiment of the inventive concept includes the article according to statement 180, wherein reading the first message from a local tunnel agent buffer by a local tunnel agent includes, based at least in part on the local tunnel agent buffer having the first message, reading the first message from a local tunnel agent buffer by a local tunnel agent.

Statement 187. An embodiment of the inventive concept includes the article according to statement 180, wherein receiving, at an NVMe SSD, a first message including a RPC over a PCIe tunnel further includes receiving a signal from a remote tunnel agent that the first message has been placed in the local tunnel agent buffer.

Statement 188. An embodiment of the inventive concept includes the article according to statement 173, wherein sending the second message from the NVMe SSD over the PCIe tunnel includes placing the second message in a remote tunnel agent buffer by a local tunnel agent.

Statement 189. An embodiment of the inventive concept includes the article according to statement 188, wherein placing the second message in a remote tunnel agent buffer by a local tunnel agent includes, based at least in part on the remote tunnel agent buffer having capacity for the second message, placing the second message in a remote tunnel agent buffer by a local tunnel agent.

Statement 190. An embodiment of the inventive concept includes the article according to statement 188, wherein the remote tunnel agent buffer is local to a host processor.

Statement 191. An embodiment of the inventive concept includes the article according to statement 188, wherein the remote tunnel agent buffer is local to the NVMe SSD.

Statement 192. An embodiment of the inventive concept includes the article according to statement 188, wherein placing the second message in a remote tunnel agent buffer by a local tunnel agent includes using a DMA engine local to a host processor.

Statement 193. An embodiment of the inventive concept includes the article according to statement 188, wherein placing the second message in a remote tunnel agent buffer by a local tunnel agent using a DMA engine local to the NVMe SSD.

Statement 194. An embodiment of the inventive concept includes the article according to statement 188, wherein placing the second message in a remote tunnel agent buffer by the local tunnel agent includes placing an address of the second message in the remote tunnel agent buffer by the local tunnel agent.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A host, comprising:
    a host processor;
    a memory;
    an operating system running on the host processor;
    an application running under the operating system on the host processor, the application including a remote procedure call (RPC) for a second processor;
    a Peripheral Component Interconnect Express (PCIe) tunnel to a Non-Volatile Memory Express (NVMe) Solid State Drive (SSD); and
    an RPC capture module in the operating system to capture the RPC from the application redirect the RPC to the NVMe SSD, and deliver a result of the RPC from the NVMe SSD to the application as though from the second processor,
    wherein the NVMe SSD may execute the RPC to generate the result.

2. The host according to claim 1, wherein the RPC capture module includes a Man in the Middle (MitM) shim.

3. The host according to claim 1, wherein the RPC capture module includes a first system call to capture the RPC from the application and a second system call to receive the result of the RPC from the NVMe SSD over the PCIe tunnel.

4. The host according to claim 1, wherein the RPC capture module includes an Ethernet frame inspector to inspect an Ethernet frame to determine that the Ethernet frame includes the RPC.

5. The host according to claim 1, further comprising a local tunnel agent to receive the RPC from the RPC capture module, the local tunnel agent including:
    a message wrapper to wrap the RPC in a message; and
    a message sender to place the message in a remote tunnel agent buffer.

6. The host according to claim 5, wherein the local tunnel agent further includes a remote tunnel agent buffer capacity check to determine that the remote tunnel agent buffer has capacity for the message.

7. The host according to claim 1, further comprising a local tunnel agent to deliver the result of the RPC to the RPC capture module, including:
    a message receiver to read a message from a local tunnel agent buffer, the message including the result of the RPC; and
    a message unwrapper to unwrap the result of the RPC from the message.

8. The host according to claim 1, further comprising the NVMe SSD, the NVMe SSD including:
    an interface to the host;
    storage for data;
    a message receiver to receive a first message from the host via the PCIe tunnel across the interface, the first message including the RPC;
    a message unwrapper to unwrap the RPC from the first message;
    an in-storage processor to execute the RPC, producing the result of the RPC;
    a message wrapper to wrap the result of the RPC in a second message; and
    a message sender to transmit the second message to the host via the PCIe tunnel across the interface.

9. A Non-Volatile Memory Express (NVMe) Solid State Drive (SSD), comprising:
    an interface to a host;
    storage for data;
    a message receiver to receive a first message from the host via a Peripheral Component Interconnect Express (PCIe) tunnel across the interface, the first message including a remote procedure call (RPC);
    a message unwrapper to unwrap the RPC from the first message;

an in-storage processor to execute the RPC, producing a result of the RPC;
a message wrapper to wrap the result of the RPC in a second message; and
a message sender to transmit the second message to the host via the PCIe tunnel across the interface.

10. The NVMe SSD according to claim 9, further comprising a local tunnel agent to read the first message from a local tunnel agent buffer and to write the second message to a remote tunnel agent buffer.

11. The NVMe SSD according to claim 10, wherein the local tunnel agent is operative to read the first message from the local tunnel agent buffer based at least in part on the local tunnel agent buffer having the first message.

12. The NVMe SSD according to claim 10, wherein the local tunnel agent further includes a remote tunnel agent buffer capacity check to determine that the remote tunnel agent buffer has capacity for the second message.

13. A method, comprising:
intercepting a remote procedure call (RPC) sent from an application to a processor;
redirecting the RPC to a Non-Volatile Memory Express (NVMe) Solid State Drive (SSD) over a Peripheral Component Interconnect Express (PCIe) tunnel;
receiving a result of the RPC from the NVMe SSD over the PCIe tunnel; and
delivering the result of the RPC to the application as though from the processor.

14. The method according to claim 13, wherein:
intercepting an RPC from an application to a processor includes capturing the RPC sent by a RPC client using a Man in the Middle (MitM) shim; and
receiving a result of the RPC from the NVMe SSD over the PCIe tunnel includes receiving the result of the RPC from the NVMe SSD over the PCIe tunnel at the MitM shim.

15. The method according to claim 13, wherein:
intercepting an RPC from an application to a processor includes capturing the RPC from the application using a first system call; and
receiving a result of the RPC from the NVMe SSD over the PCIe tunnel includes receiving the result of the RPC from the NVMe SSD using a second system call.

16. The method according to claim 13, wherein:
intercepting an RPC from an application to a processor includes:
inspecting an Ethernet frame to determine that the Ethernet frame includes the RPC; and
based at least in part on the Ethernet frame including the RPC, capturing the Ethernet frame; and
receiving a result of the RPC from the NVMe SSD over the PCIe tunnel includes receiving the result of the RPC from the NVMe SSD in a second Ethernet frame.

17. The method according to claim 13, wherein delivering the RPC to an NVMe SSD over a PCIe tunnel includes:
wrapping the RPC in a message by a local tunnel agent; and
placing the message in a remote tunnel agent buffer by the local tunnel agent.

18. The method according to claim 17, wherein placing the message in a remote tunnel agent buffer by the local tunnel agent includes, based at least in part on the remote tunnel agent buffer having capacity for the message, placing the message in the remote tunnel agent buffer by the local tunnel agent.

19. The method according to claim 13, wherein receiving a result of the RPC from the NVMe SSD over the PCIe tunnel includes:
retrieving a message from a local tunnel agent buffer by a local tunnel agent; and
unwrapping the result of the RPC from the message by the local tunnel agent.

20. The method according to claim 19, wherein retrieving a message from a local tunnel agent buffer by a local tunnel agent includes, based at least in part on the local tunnel agent buffer having the message, retrieving the message from a local tunnel agent buffer by a local tunnel agent.

21. The NVMe SSD according to claim 9, wherein an application includes the RPC, the RPC for a processor.

* * * * *